United States Patent
Chang et al.

(10) Patent No.: US 7,158,970 B2
(45) Date of Patent: *Jan. 2, 2007

(54) MAXIMIZING EXPECTED GENERALIZATION FOR LEARNING COMPLEX QUERY CONCEPTS

(75) Inventors: Edward Y. Chang, Santa Barbara, CA (US); Kwang-Ting Cheng, Santa Barbara, CA (US)

(73) Assignee: VIMA Technologies, Inc., Santa Barbara, CA (US)

( * ) Notice: Subject to any disclaimer, the term of this patent is extended or adjusted under 35 U.S.C. 154(b) by 670 days.

This patent is subject to a terminal disclaimer.

(21) Appl. No.: 10/116,383

(22) Filed: Apr. 2, 2002

(65) Prior Publication Data

US 2003/0065661 A1 Apr. 3, 2003

Related U.S. Application Data

(63) Continuation-in-part of application No. 10/032,319, filed on Dec. 21, 2001

(60) Provisional application No. 60/292,820, filed on May 22, 2001, and provisional application No. 60/281,053, filed on Apr. 2, 2001.

(51) Int. Cl.
*G06F 17/30* (2006.01)
*G06F 7/00*

(52) U.S. Cl. .................................... 707/5; 707/3; 707/4

(58) Field of Classification Search .......... 707/1–104.1; 345/440, 418, 853–854, 700, 764, 866, 835; 382/305, 276, 209, 181, 217–218, 220; 704/1–2, 704/7; 706/11, 45; 715/514–515, 522, 530; 717/100, 114
See application file for complete search history.

(56) References Cited

U.S. PATENT DOCUMENTS 5,259,067 A * 11/1993 Kautz et al. .................. 706/57

(Continued)

FOREIGN PATENT DOCUMENTS

| JP | 361248130 A | * | 11/1986 |
| JP | 401244528 A | * | 9/1989 |
| JP | 03040170 A | * | 2/1991 |

OTHER PUBLICATIONS

Daniel S. Hirschberg, Michael J. Pazzani, Kamal M. Ali, "Average Case Analysis of k–CNF and k–DNF learning algorithms", Jul. 1, 1994, Department of Information and Computer Science University of California, pp. 1–18.*

(Continued)

*Primary Examiner*—Don Wong
*Assistant Examiner*—Linh Black
(74) *Attorney, Agent, or Firm*—Morrison & Foerster LLP

(57) ABSTRACT

A method of learning a user query concept is provided which includes a sample selection stage and a feature reduction stage; during the sample selection stage, sample objects are selected from a query concept sample space bounded by a k-CNF and a k-DNF; the selected sample objects include feature sets that are no more than a prescribed amount different from a corresponding feature set defined by the k-CNF; during the feature reduction stage, individual features are removed from the k-CNF that are identified as differing from corresponding individual features of sample objects indicated by the user to be close to the user's query concept; also during the feature reduction stage, individual features are removed from the k-DNF that are identified as not differing from corresponding individual features of sample objects indicated by the user to be not close to the user's query concept.

26 Claims, 20 Drawing Sheets

(8 of 20 Drawing Sheet(s) Filed in Color)

U.S. PATENT DOCUMENTS

| | | | | | |
|---|---|---|---|---|---|
| 5,265,207 | A | * | 11/1993 | Zak et al. | 712/15 |
| 5,414,853 | A | * | 5/1995 | Fertig et al. | 717/106 |
| 5,636,328 | A | * | 6/1997 | Kautz et al. | 706/45 |
| 5,666,528 | A | | 9/1997 | Thai | 707/102 |
| 6,006,225 | A | | 12/1999 | Bowman et al. | 707/5 |
| 6,263,335 | B1 | | 7/2001 | Paik et al. | 707/5 |
| 6,377,945 | B1 | | 4/2002 | Risvik | 707/3 |
| 6,408,293 | B1 | | 6/2002 | Aggarwal et al. | 707/3 |
| 6,418,432 | B1 | | 7/2002 | Cohen et al. | 707/5 |
| 6,535,873 | B1 | | 3/2003 | Fagan et al. | 707/3 |
| 6,662,235 | B1 | * | 12/2003 | Callis et al. | 719/318 |
| 6,675,159 | B1 | | 1/2004 | Lin et al. | 707/3 |
| 6,714,201 | B1 | * | 3/2004 | Grinstein et al. | 345/474 |
| 6,728,952 | B1 | * | 4/2004 | Carey et al. | 717/141 |
| 2004/0267458 | A1 | * | 12/2004 | Judson et al. | 702/20 |

OTHER PUBLICATIONS

Leonard Pitt, Leslie G. Valiant, "Computational Limitations on Learning from Examples", ACM, 1998, pp. 965–984.*

B.K. Natarajan, "On Learning Boolean Functions", ACM, 1987, pp. 296–304.*

Nina Mishra, Leonard Pitt, "Generating all Maximal Independent Sets of Bounded–degree Hypergraphs", ACM, 1997, pp. 211–217.*

Aho, Alfred V. et al. (1994) "Foundations of Computer Science," Computer Science Press, and imprint of W.H. Freeman and Company, New York, pp. 634–636, 667–670.

Billard, David (Aug. 26–28, 1998) "Multipurpose Internet Shopping Basket," Database and Expert Systems Applications. Proceedings of the Ninth International Workshop, pp. 685–690.

Djeraba, Chabane et al. (Apr. 22–24, 1998) "Concept–Based Query in Visual Information Systems," Research and Technology Advances in Digital Libraries, pp. 299–308.

Mitchell, Tom M. ((1997) "Machine Learning," The McGraw–Hill Companies, Inc., pp. 20–51, 213–215.

E. Chang et al., "MEGA—The Maximizing Expected Generalization Algorithm for Learning Complex Query Concepts", Technical Report, Nov. 2000, pp. 1–39.

M. Kearns et al., "Learning Boolean formulae", Journal of ACM; 41(6):1298–1328, 1994.

M. Kearns and U. Vazirani, "An Introduction to Computational Learning Theory", MIT Press, 3 pgs. 1994.

P. Langley and W. Iba, "Average–case analysis of a nearest neighbor algorithm", Proceedings of the 13th International Joint Conference on Artificial Intelligence, (82):889–894, 1993.

P. Langley and S. Sage, "Scaling to domains with many irrelevant features", Computational Learning Theory and Natural Learning Systems, 29 pgs., 1997.

C. Li, et al., "Clustering for approximate similarity queries in high–dimensional spaces", IEEE Transaction on Knowledge and Data Engineering, 41 pgs., 2001.

T. Michell, "Machine Learning", McGraw Hill, 1997.

M. Ortega, "Supporting ranked Boolean similarity queries in MARS", IEEE Transaction on Knowledge and Data Engineering, 10(6):905–925, Dec. 1999.

K. Porkaew et al., "Query refinement for multimedia similarity retrieval in MARS", Proceedings of ACM Multimedia, 12 pgs., Nov. 1999.

K. Porkaew et al., "Query reformulation for content based multimedia retrieval in MARS", ICMCS, 18 pgs., 1999.

Y. Rui et al., "Image retrieval: Current techniques, promising directions, and open issues", Journal of Visual Communication and Image Representation, 17 pgs., Mar. 1999.

Y. Rui et al., "Relevance feedback: A power tool in interactive content–based image retrieval", IEEE Tran on Circuits and Systems for Video Technology, 8(5), 13 pgs. Sep. 1998.

J. R. Smith et al., "Tools and Techniques for Color Image Retrieval", IS&T/SPIE Proceedings vol. 2670, Stor. & Retr. for Image and Video Databases IV, 1996, 12 pgs.

L. Valiant, "A theory of learnable", Proceedings of the Sixteenth Annual ACM Symposium on Theory of Computing, pp. 436–445, 1984.

L. Wu et al., "Falcon: Feedback adaptive loop for content–based retrieval", The 26th VLDB Conference, 10 pgs., Sep. 2000.

L. A. Zadeh, "Fuzzy sets", Information and Control, pp. 338–353, 1965.

U.S. Appl. No. 60/281,053, filed Apr. 2, 2001, Chang et al.

U.S. Appl. No. 60/324,766, filed Sep. 24, 2001, Chang.

U.S. Appl. No. 60/292,820, filed May 22, 2001, Chang et al.

E. Chang and T. Cheng, "Perception–based image retrieval", ACM Sigmod (Demo), May 2001.

E. Chang, B. Li, "Towards perception–based image retrieval", IEEE, Content–Based Access of Image and Video Libraries, 5 pgs, Jun. 2000.

I. J. Cox, et al., "The Bayesian image retrieval system, Pichunter: Theory, implementation and psychological experiments", IEEE Transaction on Image Processing, 19 pgs. 2000.

R. Fagin, "Fuzzy queries in multimedia database systems", ACM Sigacr–Sigmod–Sigart Symposium on Principles of Database Systems, 22 pgs., 1998.

R. Fagin and E. L. Wimmers, "A formula for incorporating weights into scoring rules", International Conference on Database Theory, 28 pgs, 1997.

J. Flusser et al., "On the Calculation of Image Moments".

Y. Freund, et al., "Selective sampling using the query by committee algorithm", Machine Learning, 28:133–168, 1997.

Y. Ishikawa et al., "Mindreader: Querying databases through multiple examples", VLDB, 22 pgs., 1998.

* cited by examiner

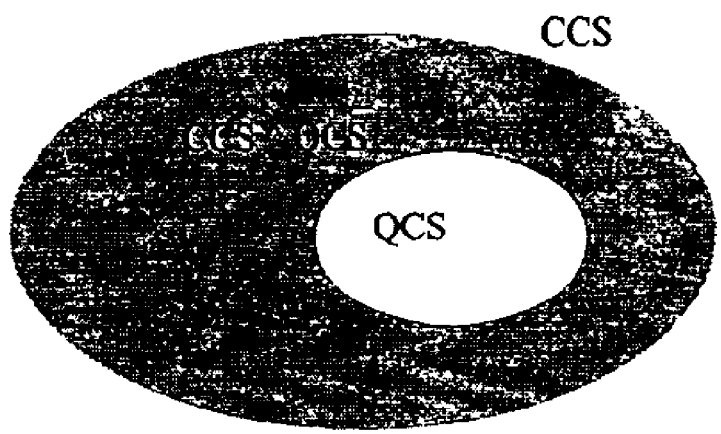
Figure 2: MEGA's Sampling Space: $CCS \wedge \overline{QCS}$.

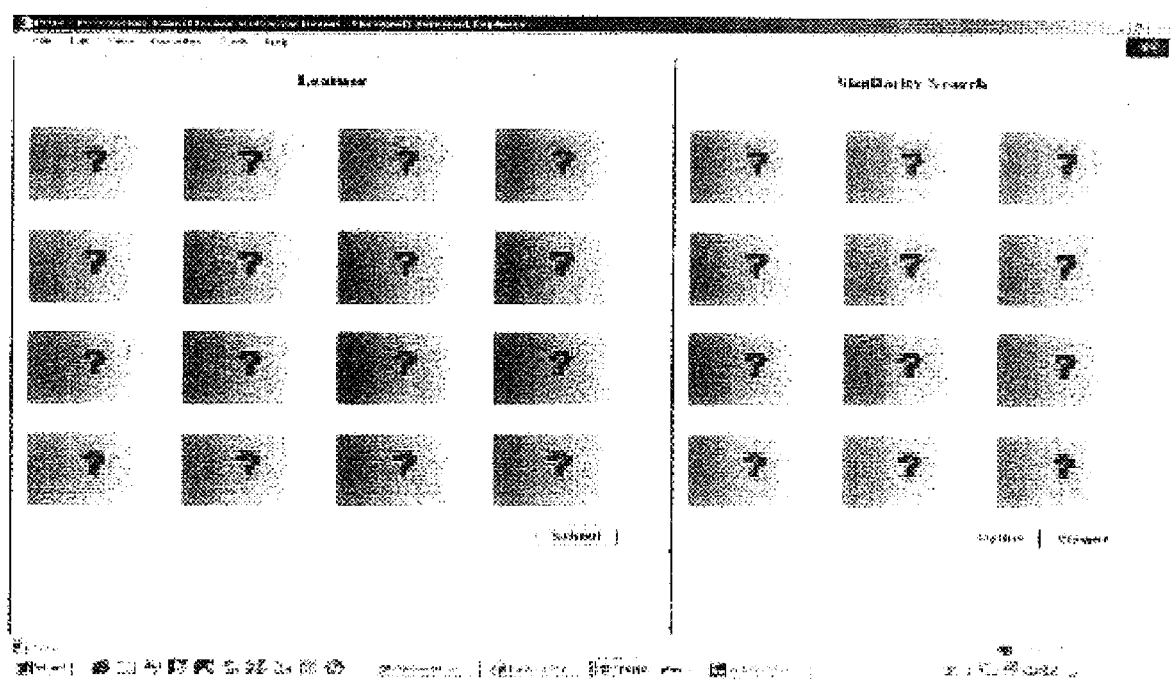
Figure 3: Wild Animal Query Screen #1.

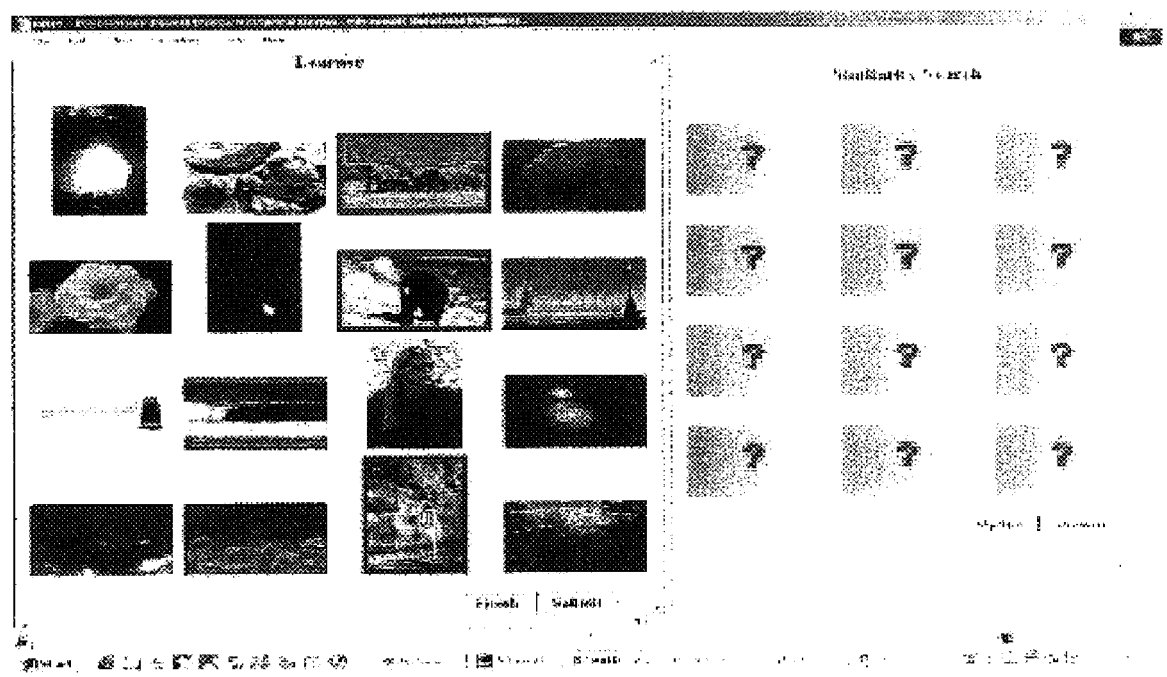
Figure 4: Wild Animal Query Screen #2.

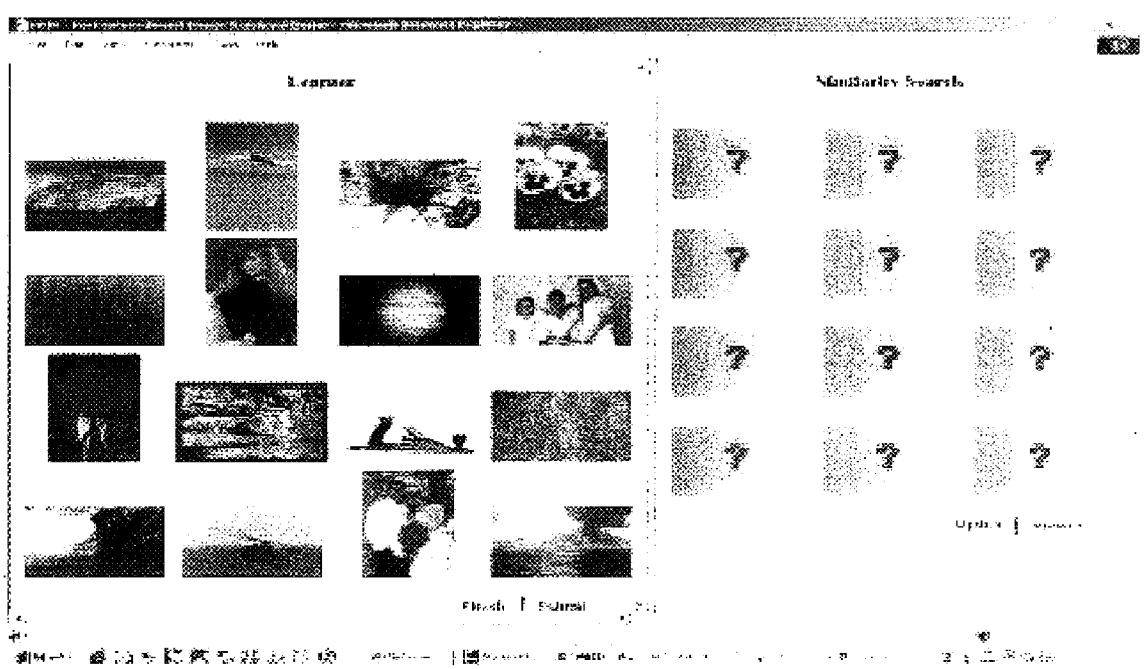
Figure 5: Wild Animal Query Screen #3.

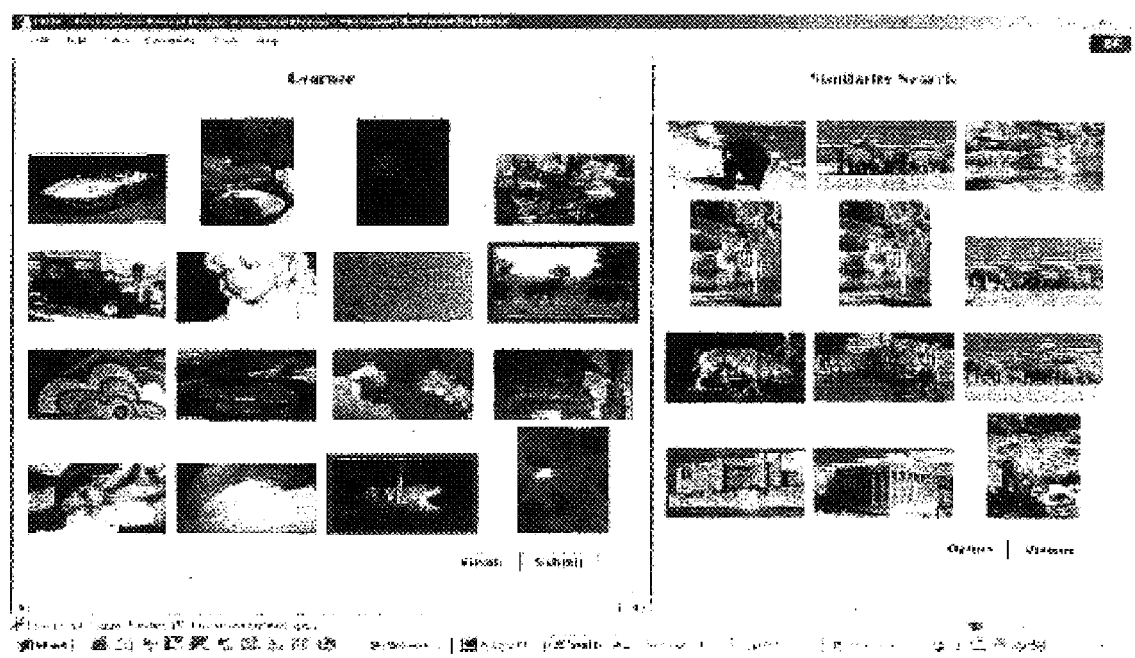
Figure 6: Wild Animal Query Screen #4.

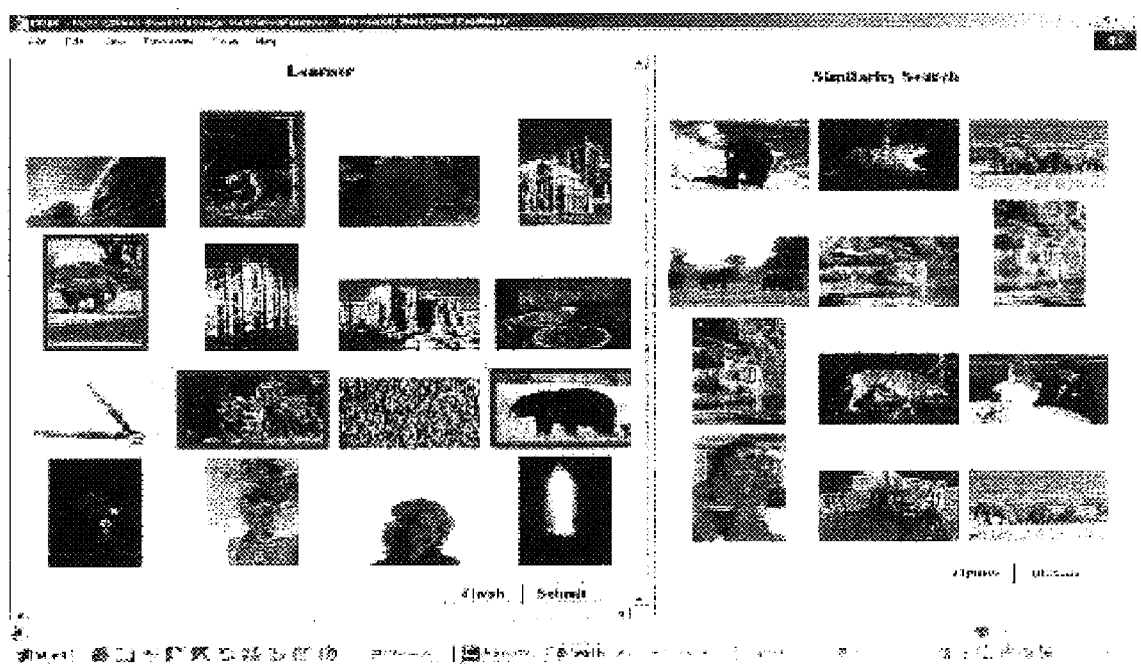
Figure 7: Wild Animal Query Screen #5.

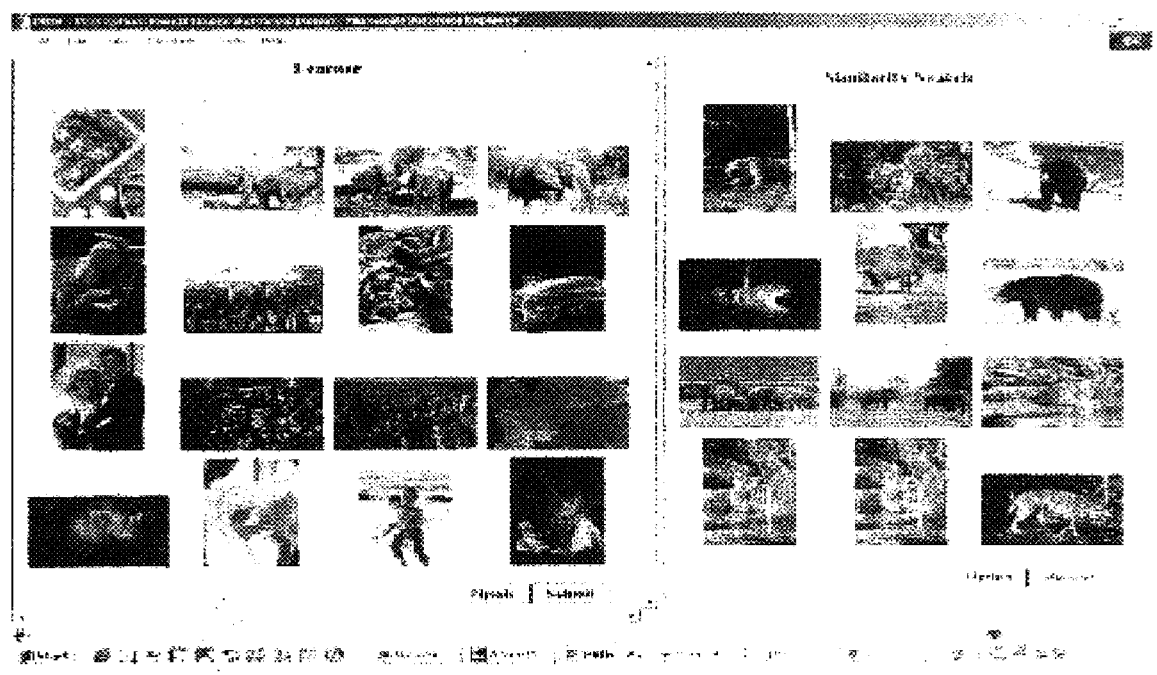
Figure 8: Wild Animal Query Screen #6.

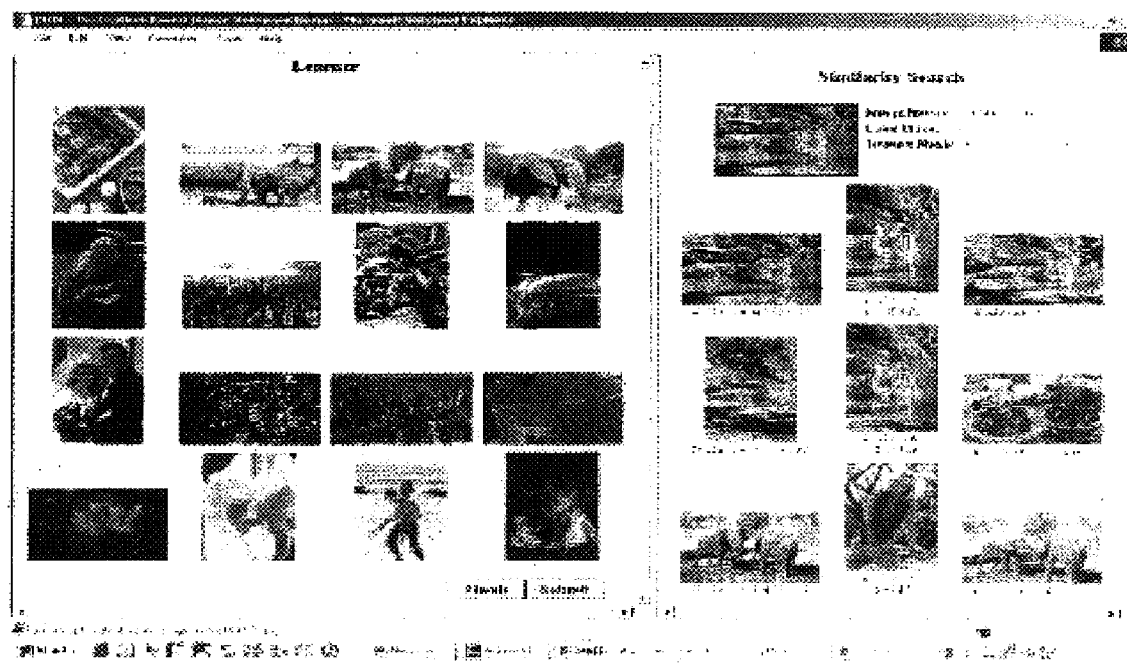
Figure 9: Wild Animal Similarity (Screen #7).

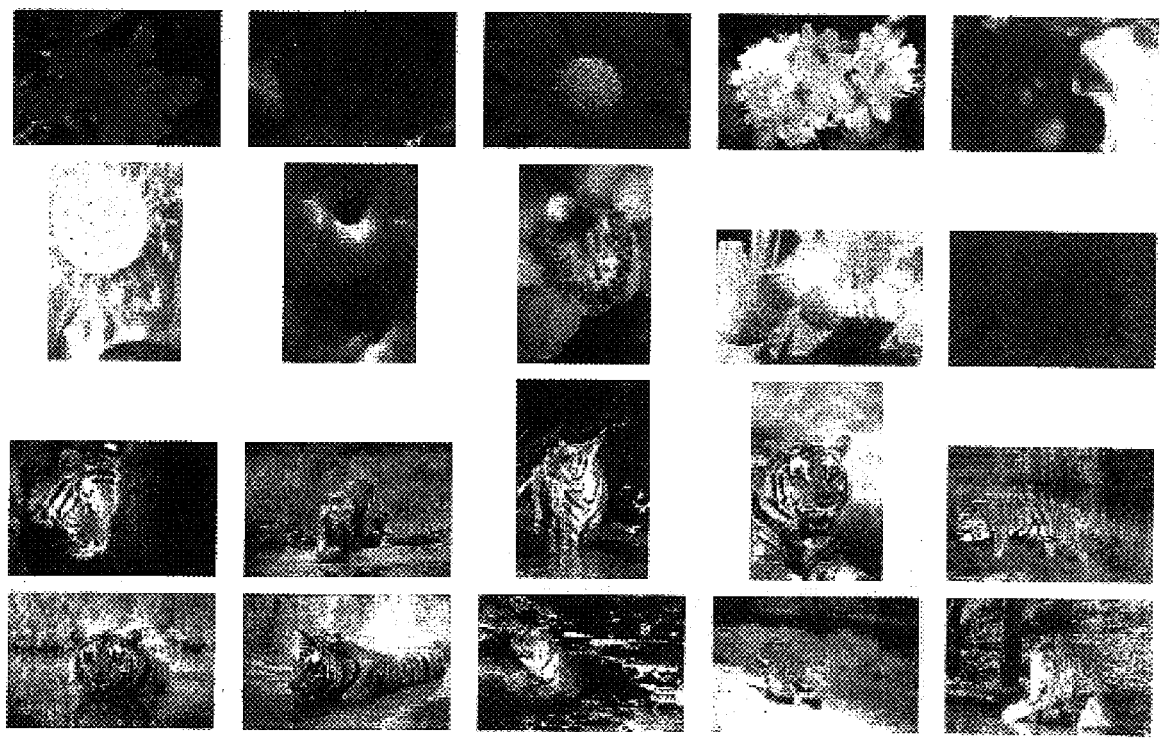
Figure 10: Flowers and Tigers Sample Query Results from SVM$_{Active}$.

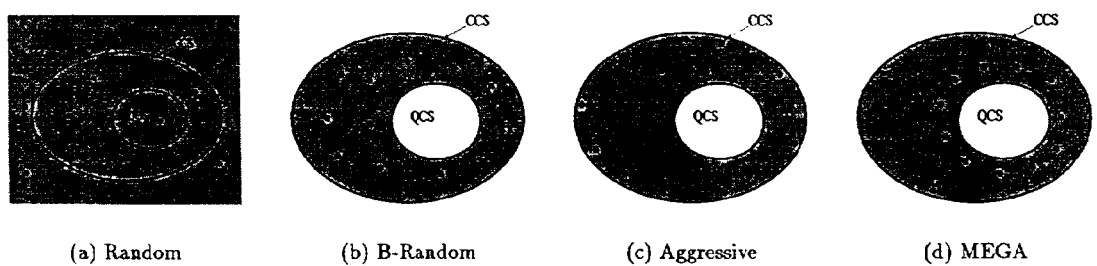
Figure 11: Sampling Schemes.

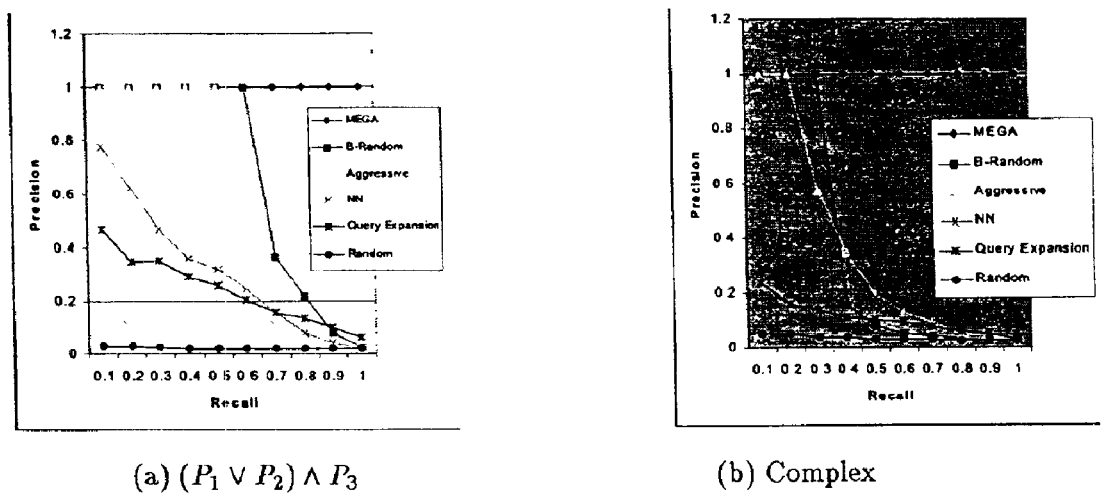
Figure 12: Precision vs. Recall (10 Features).

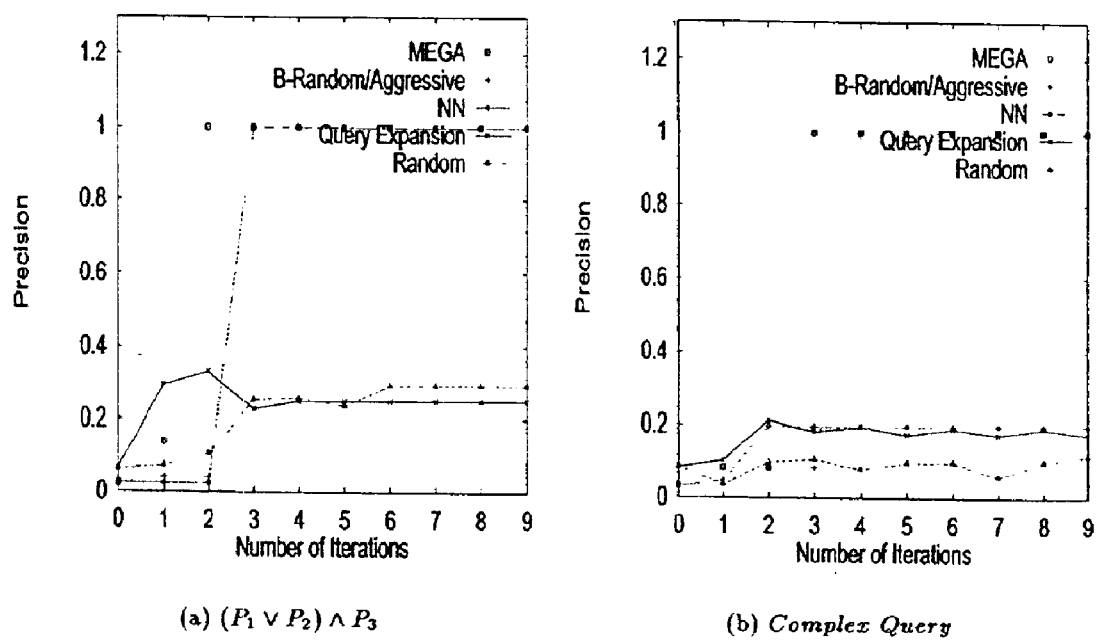
Figure 13: Precision of Six Schemes at Recall = 50%.

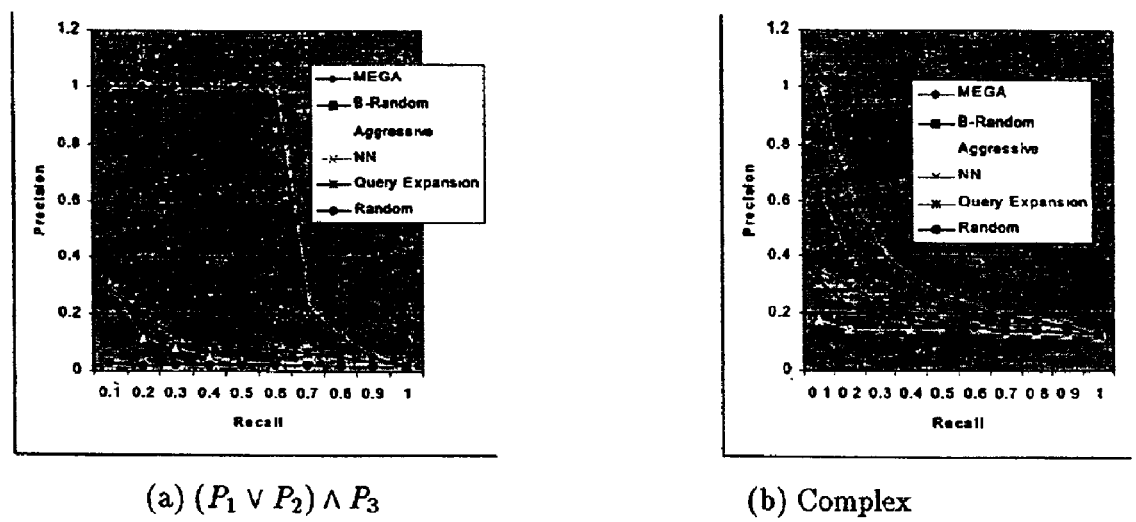
(a) $(P_1 \vee P_2) \wedge P_3$
(b) Complex
Figure 14: Precision vs. Recall (20 Features).

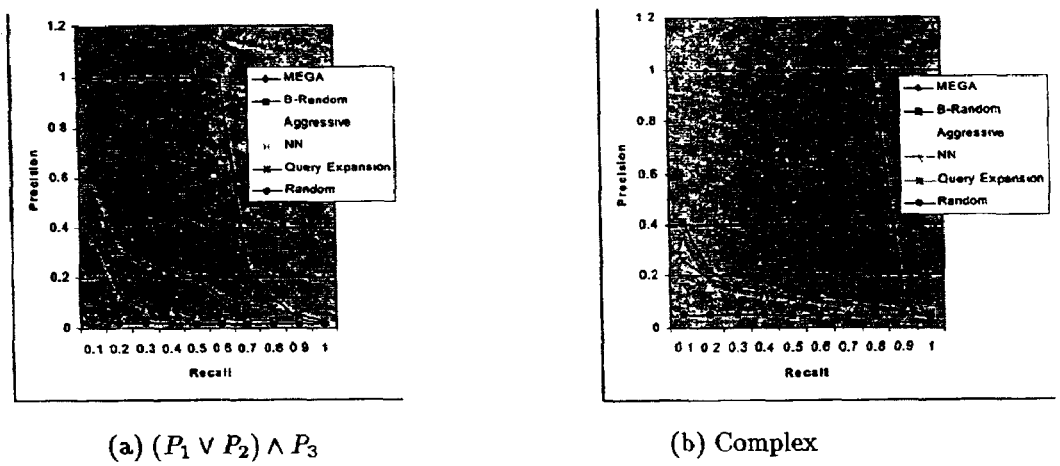
(a) $(P_1 \vee P_2) \wedge P_3$        (b) Complex
Figure 15: Precision vs. Recall (30 Features).

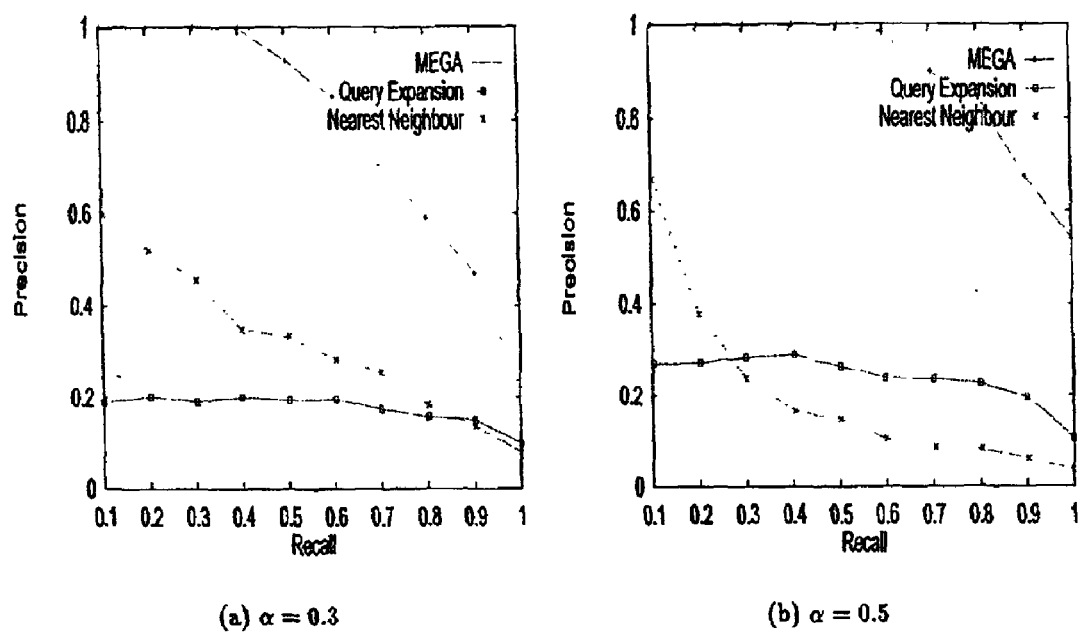
Figure 16: Recall vs. Precision (Model Bias Test).

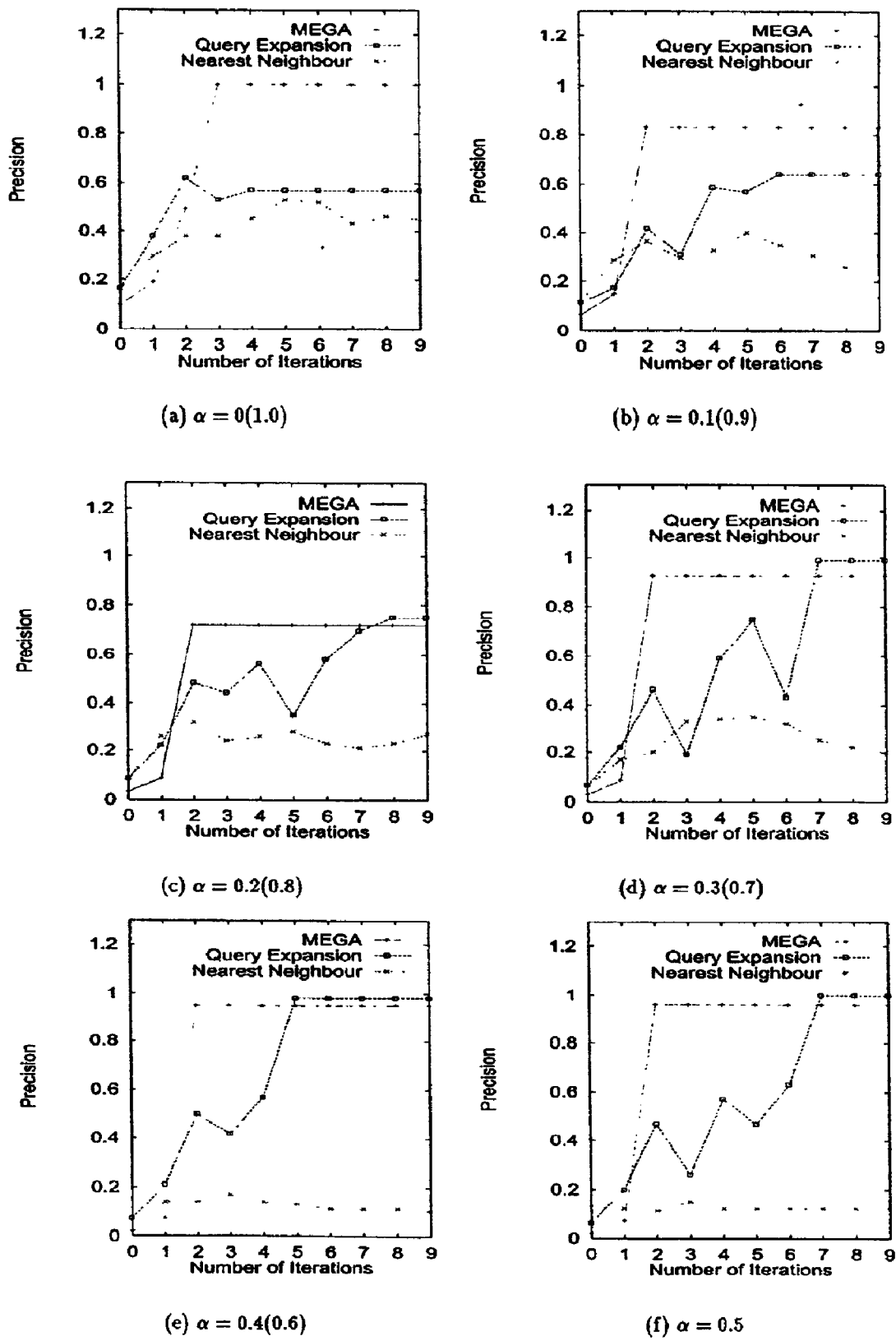
Figure 17: The Effect of Different α's.

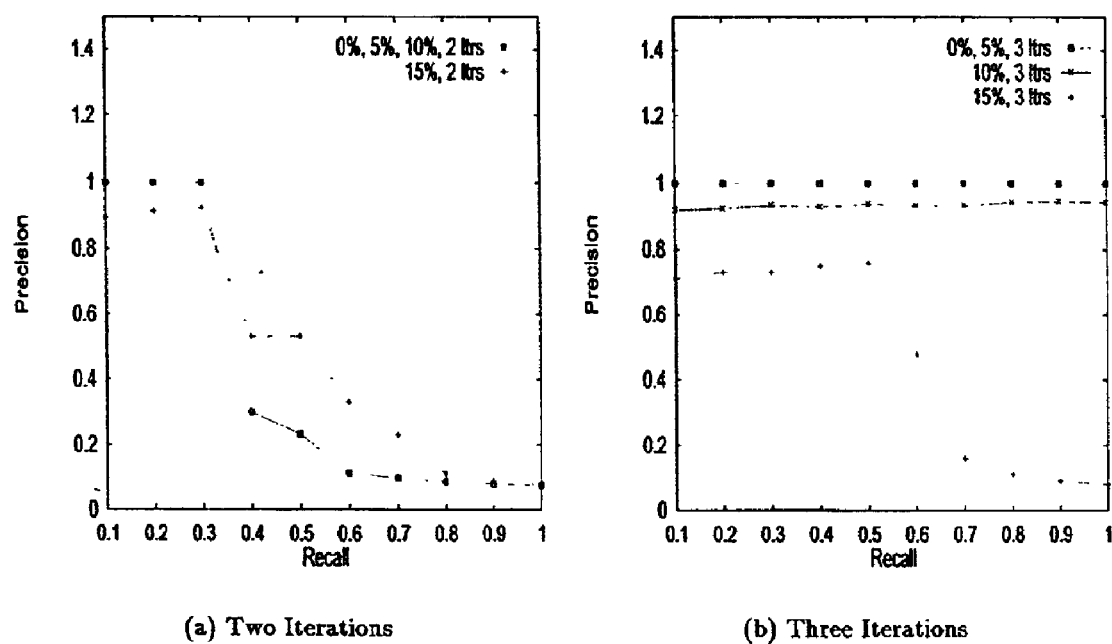
Figure 18: Precision/Recall Under 0%, 5%, 10% and 15% Noise.

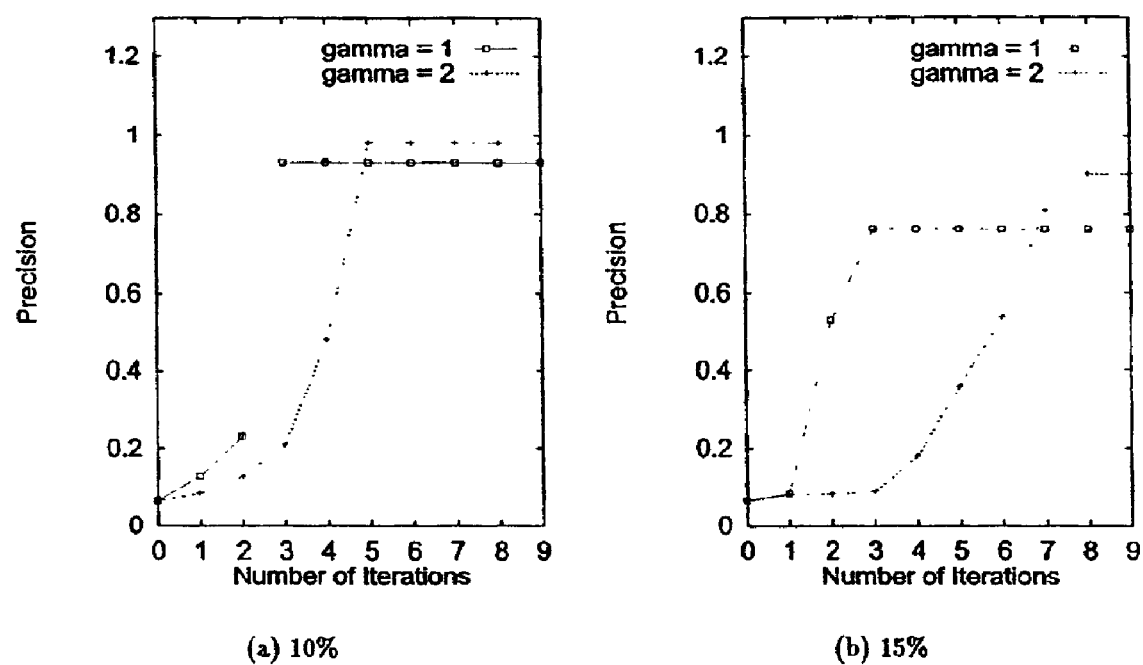
Figure 19: Effects of Noise.

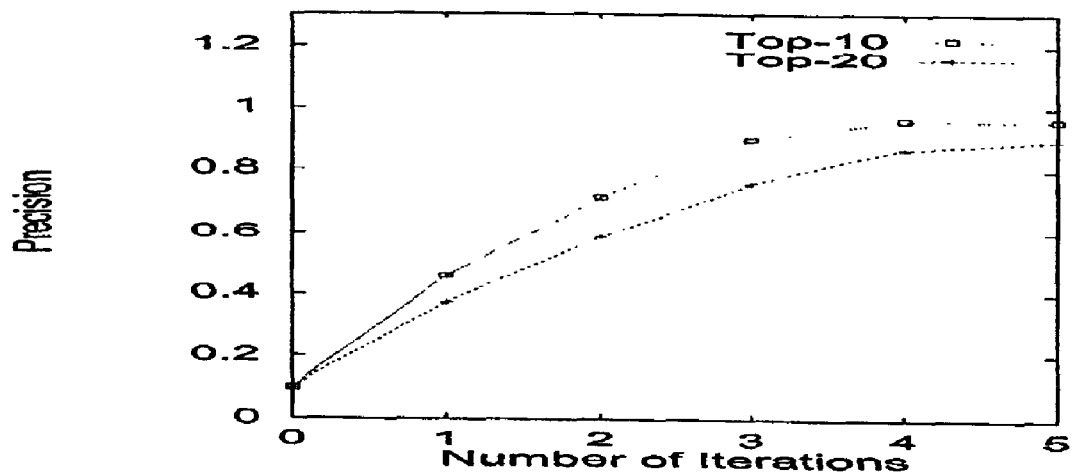
Figure 20: Average Precision of Top-10 and Top-20 Queries.

MAXIMIZING EXPECTED GENERALIZATION FOR LEARNING COMPLEX QUERY CONCEPTS

CROSS-REFERENCE TO RELATED APPLICATIONS

This application is a continuation-in-part of Ser. No. 10/032,319, filed Dec. 21, 2001. This application claims the benefit of the filing date of commonly owned provisional patent application Ser. No. 60/292,820, filed May 22, 2001; and also claims the benefit of the filing date of commonly assigned provisional patent application, Ser. No. 60/281,053, filed Apr. 2, 2001.

BACKGROUND OF THE INVENTION

1. Field of the Invention

The invention relates in general to information retrieval and more particularly to query-based information retrieval.

2. Description of the Related Art

A query-concept learning approach can be characterized by the following example: Suppose one is asked, "Are the paintings of Leonardo da Vinci more like those of Peter Paul Rubens or those of Raphael?" One is likely to respond with: "What is the basis for the comparison?" Indeed, without knowing the criteria (i.e., the query concept) by which the comparison is to be made, a database system cannot effectively conduct a search. In short, a query concept is that which the user has in mind as he or she conducts a search. In other words, it is that which the user has in mind that serves as his or her criteria for deciding whether or not a particular object is what the user seeks.

For many search tasks, however, a query concept is difficult to articulate, and articulation can be subjective. For instance, in a multimedia search, it is difficult to describe a desired image using low-level features such as color, shape, and texture (these are widely used features for representing images [17]). Different users may use different combinations of these features to depict the same image. In addition, most users (e.g., Internet users) are not trained to specify simple query criteria using SQL, for instance. In order to take individuals' subjectivity into consideration and to make information access easier, it is both necessary and desirable to build intelligent search engines that can discover (i.e., that can learn) individuals' query concepts quickly and accurately.

REFERENCES

[1] E. Chang and T. Cheng. Perception-based image retrieval. *ACM Sigmod (Demo)*, May 2001.
[2] E. Chang, B. Li, and C. L. Towards perception-based image retrieval. *IEEE, Content-Based Access of Image and Video Libraries*, pages 101–105, June 2000.
[3] I. J. Cox, M. L. Miller, T. P. Minka, T. V. Papathomas, and P. N. Yianilos. The Bayesian image retrieval system, Pichunter: Theory, implementation and psychological experiments. *IEEE Transaction on Image Processing (to appear)*, 2000.
[4] R. Fagin. Fuzzy queries in multimedia database systems. *ACM Sigacr-Sigmod-Sigart Symposium on Principles of Database Systems*, 1998.
[5] R. Fagin and E. L. Wimmers. A formula for incorporating weights into scoring rules. *International Conference on Database Theory*, pages 247–261, 1997.
[6] Y. Freund, H. S. Seung, E. Shamir, and N. Tishby. Selective sampling using the query by committee algorithm. *Machine Learning*, 28:133–168, 1997.
[7] Y. Ishikawa, R. Subramanya, and C. Faloutsos. Mindreader: Querying databases through multiple examples. *VLDB*, 1998.
[8] M. Kearns, M. Li, and L. Valiant. Learning Boolean formulae. *Journal of ACM*, 41(6):1298–1328, 1994.
[9] M. Kearns and U. Vazirani. *An Introduction to Computational Learning Theory*. MIT Press, 1994.
[10] P. Langley and W. Iba. Average-case analysis of a nearest neighbor algorithm. *Proceedings of the 13$^{th}$ International Joint Conference on Artificial Intelligence*, (82):889–894, 1993.
[11] P. Langley and S. Sage. Scaling to domains with many irrelevant features. *Computational Learning Theory and Natural Learning Systems*, 4, 1997.
[12] C. Li, E. Chang, H. Garcia-Molina, and G. Wiederhold. Clustering for approximate similarity queries in high-dimensional spaces. *IEEE Transaction on Knowledge and Data Engineering (to appear)*, 2001.
[13] T. Michell. *Machine Learning*. McGraw Hill, 1997.
[14] M. Ortega, Y. Rui, K. Chakrabarti, A. Warshavsky, S. Mehrotra, and T. S. Huang. Supporting ranked Boolean similarity queries in mars. *IEEE Transaction on Knowledge and Data Engineering*, 10(6):905–925, December 1999.
[15] K. Porkaew, K. Chakrabarti, and S. Mehrotra. Query refinement for multimedia similarity retrieval in mars. *Proceedings of ACM Multimedia*, November 1999.
[16] K. Porkaew, S. Mehrota, and M. Ortega. Query reformulation for content based multimedia retrieval in mars. *ICMCS*, pages 747–751, 1999.
[17] Y. Rui, T. S. Huang, and S. -F. Chang. Image retrieval: Current techniques, promising directions, and open issues. *Journal of Visual Communication and Image Representation*, March 1999.
[18] Y. Rui, T. S. Huang, M. Ortega, and S. Mehrotra. Relevance feedback: A power tool in interactive content-based image retrieval. *IEEE Tran on Circuits and Systems for Video Technology*, 8(5), September 1998.
[19] L. Valiant. A theory of learnable. *Proceedings of the Sixteenth Annual ACM Symposium on Theory of Computing*, pages 436–445, 1984.
[20] L. Wu, C. Faloutsos, K. Sycara, and T. R. Payne. Falcon: Feedback adaptive loop for content-based retrieval. *The 26$^{th}$ VLDB Conference*, September 2000.
[21] L. A. Zadeh. Fuzzy sets. *Information and Control*, pages 338–353, 1965.

SUMMARY OF THE INVENTION

In one embodiment of the invention, a method of learning a user query concept is provided which includes a sample selection stage and a feature reduction stage. During the sample selection stage, sample objects are selected from a query concept sample space bounded by a k-CNF and a k-DNF. The selected sample objects include feature sets that are no more than a prescribed amount different from a corresponding feature set defined by the k-CNF. During the feature reduction stage, individual features may be removed from the k-CNF that are identified as differing from corresponding individual features of sample objects indicated by the user to be close to the user's query concept. Also during the feature reduction stage, individual features may be removed from the k-DNF that are identified as not differing from corresponding individual features of sample objects indicated by the user to be not close to the user's query concept.

In one inventive aspect, a sample selection stage in accordance with one embodiment of the invention selects sample objects that are likely (1) to be indicated by the user as being close to the user's query concept, and (2) to include features that differ from corresponding features represented in the k-CNF. The samples are selected according to a careful balancing of these two conflicting criteria. The first criterion aims to elicit from the user indications of which sample objects are close and which are not close to the user's query concept. The second criterion aims to identify those features that are not relevant to the user's query concept.

In another inventive aspect, the feature reduction stage adjusts the user query concept sample space. The feature reduction stage removes certain features from the k-CNF based on samples indicated by the user to be close to the user's query concept. The features removed from the k-CNF differ from corresponding features of a sample object indicated as close to the query concept. The feature reduction stage removes certain features from the k-DNF based on sample objects indicated by the user to be not close to the user's query concept. The features removed from the k-DNF do not differ from corresponding features of a sample object identified as not close to the query concept.

These and other features and advantages will be described and illustrated in the following detailed description and the appended drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 is an illustrative drawing that represents in conceptual terms the relationship between a QCS and a CCS;

FIGS. 3–9 is an illustrative sequence of example display screens in the order presented to a user during an example user query learner process;

FIG. 10 is a screen that shows flowers and tigers sample query results from $SVM_{Active}$;

FIGS. 11(a)–(d) illustrates several sampling schemes; the main features shown are: (a) Random—samples randomly selected from the bulk of the domain; (b) Bounded Random—samples randomly selected from between QCS and CCS; (c) Aggressive—samples selected from the unlabeled ones that satisfy the most general concepts in CCS; and (d) MEGA—samples selected between QCS and CCS to eliminate the maximum expected number of terms;

FIG. 12 is an illustrative representation of precision/recall after three user iterations of the several sampling schemes learning the two concepts, $(P_1 \lor P_2) \land P_3$ and $P_1 \land (P_2 \lor P_3) \land (P_4 \lor P_5 \lor P_6) \land (P_2 \lor P_4 \lor P_7)$;

FIG. 13 illustrates precision/recall of the several sampling schemes;

FIG. 14 illustrates precision versus recall of 20 features;

FIG. 15 illustrates precision versus recall of 30 features;

FIG. 16 illustrates recall versus precision (Model Bias Test) that presents three schemes for learning the two concepts after three user iterations;

FIGS. 17(a)–(f) illustrate results of learning concept $P_2$ with the effects of different settings of $\alpha$;

FIG. 18 illustrates precision/recall after two or three user iterations under different error rates;

FIGS. 19(a)–(b) illustrates results of recall fixed at 50% and how the different error rates and $\gamma$ settings affect learning precision;

FIG. 20 illustrates average precision of the top-10 and top-20 retrieval of all queries with respect to the number of iterations.

Figure 1:
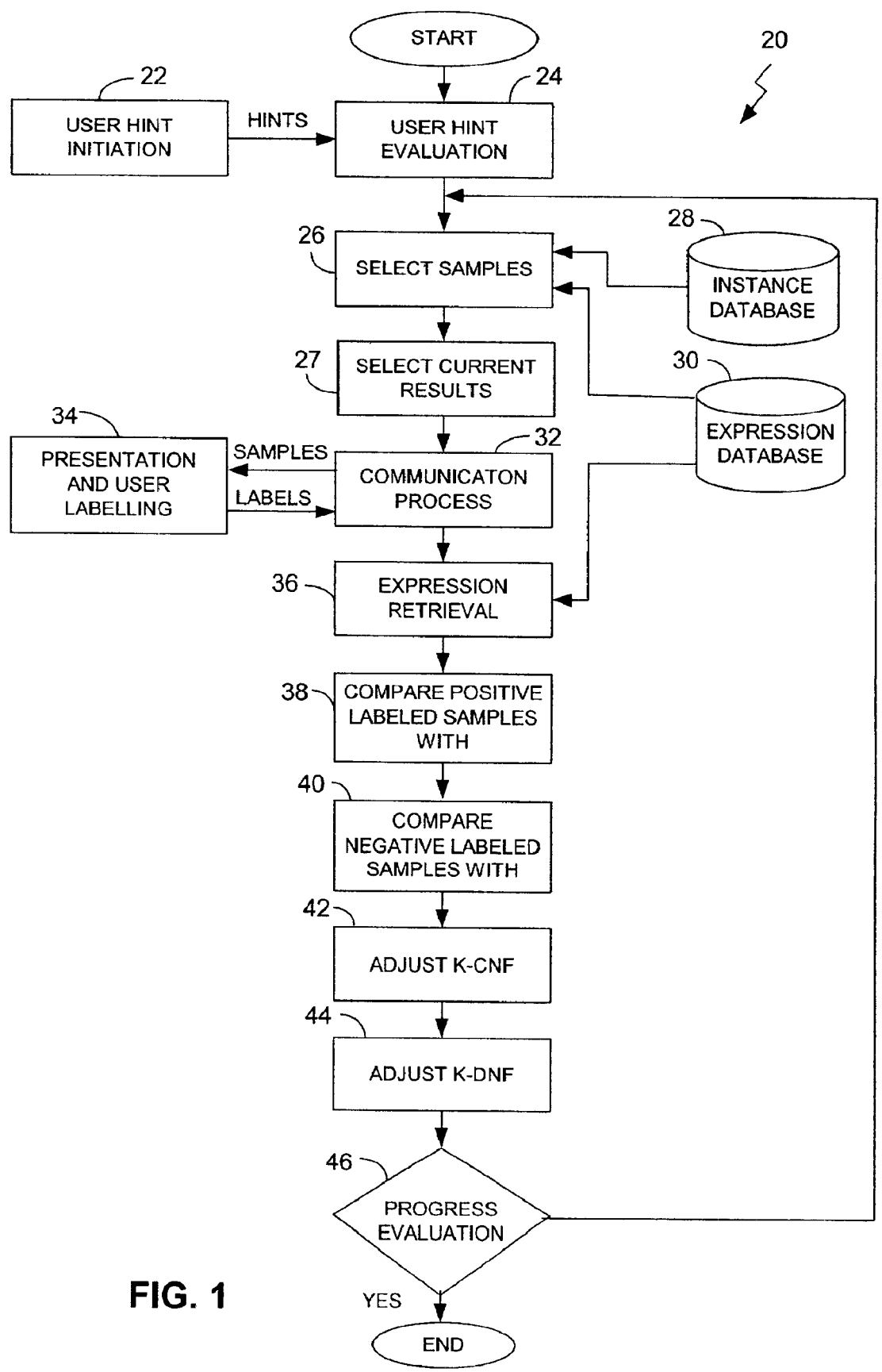
FIG. 1 is a generalized flow diagram which illustrates the overall flow of a user query-concept learner process.

DETAILED DESCRIPTION OF THE PREFERRED EMBODIMENTS 1.0 Introduction

The present invention provides a query-concept learner process and a computer software based apparatus used to "learn" a query concept through an intelligent sampling process. The query-concept learner process fulfills two primary goals. By "learns," it is meant that the query-concept learner process evaluates user feedback as to the relevance of sample objects presented to the user in order to select from a database objects that are very likely to match, or at least come very close to matching, a user's query concept. One, the concept-learner's hypothesis space must not be too restrictive, so it can model most practical query concepts. Two, the concept-learner should grasp a concept quickly and with a relatively small number of sample objects, since most users do not wait around to provide a great deal of feedback. To fulfill these design goals, the present invention uses a query-concept learner process that we refer to as, the Maximizing Expected Generalization Algorithm (MEGA). MEGA models query concepts in k-CNF [8], which can model almost all practical query concepts. k-CNF is more expressive than k-DNF, and it has both polynomial sample complexity and time complexity [9, 13].

MEGA includes two sub-processes to ensure that a wide range of query concepts can be learned quickly, with a relatively small number of samples. The first involves a sample selection (S-stage) process. The second involves a feature reduction (F-stage) process. In the S-stage, MEGA judiciously selects samples aimed at collecting maximum information from users to remove irrelevant features in its subsequent F-stage. In the F-stage, MEGA seeks to remove irrelevant terms from the query-concept (i.e., a k-CNF), and at the same time, refines the sampling boundary (i.e., a k-DNF). The refinement of the k-CNF and k-DNF aims to produce a smaller query concept sample space from which to select sample objects. A goal of the refinement process is to provide a smaller sample space from which even more informative samples can be selected in a subsequent S-stage. MEGA is a recursive process. The two-stage process (S-stage followed by F-stage) repeats, each time with a smaller sample space and a smaller set of features, until the user query concept has been identified adequately. Unlike prior query refinement methods, which typically use only the S-stage or only the F-stage (Section 12.0 highlights related work), MEGA uses these two steps in a complementary way to achieve fast convergence to target concepts.

In a present embodiment, in order to evaluate a user query concept efficiently, the MEGA query-concept learner process uses a multi-resolution/hierarchical learning method. Features are divided into subgroups of different resolutions. As explained more fully below, a present embodiment of the query-concept learner process exploits the multi-resolution/hierarchical structure of the resolution hierarchy to reduce learning space and time complexity. It is believed that when features are divided carefully into G groups, MEGA can achieve a speedup of $O(G^{k-1})$ with little precision loss.

Much of this document describes aspects of the invention in terms of objects that are manifested as images. However, the invention is not limited to image objects. Rather, the principles of the invention apply broadly to any object that possesses a combination of attributes (features) that can be represented as an expression stored in a computer storage medium. More generally, the principles of the invention apply to any object that can be represented in a relational database since a k-CNF and a k-DNF are supersets of a relational database. For instance, the objects could be text document objects, video objects, sound (or music) objects or representative of items in the physical world such as machines, even persons, since each of these object types has attributes that can be used to represent them in a k-CNF or k-DNF. Thus, the invention is not intended to be limited to the image object embodiments described herein.

1.1 Overview of Operation of the User Query-Concept Learner Process

Referring to the illustrative drawing of FIG. 1, there is shown a generalized flow diagram which illustrates the overall flow of a user query-concept learner process 20 in accordance with a present embodiment of the invention. In one embodiment, a user initiates the process by providing hints about his or her current query-concept. This initialization process involves a user hint initiation process 22 that may run on a user computer (not shown) and a hint evaluation process 24 that may run on a separate computer (not shown). Alternatively, the user hint initiation process 22 and the hint evaluation Process 24 can run together on the same computer. The objective is to use user hints to bootstrap an overall learner process by using an initial set of hints about the user's concept to produce an initial set of positive sample objects that are likely to match the user's query-concept and to produce an initial set of negative sample objects that are not likely to match the user's query-concept. This initialization process may involve the user hint initiation process 22 prompting a user to provide hints about the user's query concept. The hint evaluation process 24 evaluates the user's hints in order to generate an initial set of samples.

Once the process has been initialized, a software-based sample selection process 26 selects samples for presentation to the user by a software-based presentation process 28. The samples are selected from a query-concept sample space demarcated by a QCS, modeled as a k-CNF, and a CCS, modeled as a k-DNF. In one embodiment, the sample objects comprise sample images, and the sample images correspond to expressions that represent the features of the images. The samples are stored in an instance database 28. The expressions are stored in an expression database 30. The sample selection process evaluates these expressions in view of the QCS and the CCS in order to determine which samples to present to the user. The sample images are carefully selected in order to garner the maximum information from the user about the user's query concept. As explained below, a sample generally should be selected that is sufficiently close to the QCS so that the user is likely to label the sample as positive. Conversely, the sample generally should be selected that is sufficiently different from the QCS so that a positive labeling of the sample can serve as an indicator of what features are irrelevant to the user's query-concept. Positive-labeled samples can be an indication of irrelevance of certain features because such positive selection may serve as an indication that features of such sample that contradict the QCS are irrelevant to the user's query concept.

A computer software based select current results process 27 selects from the object database 28 objects that are representative of the current results of the user query learning process. In one embodiment, in which the database 28 stores images, the selected objects include image objects that are representative of the user query concept as currently understood by the learning process. A current understanding of the user query concept is represented by the current QCS, modeled as a k-CNF, and a CCS, modeled as a k-DNF. The selected current results process 27 uses a distance function, of a general type described in Section 1.4, to select current results image objects based upon expressions in the expression database 30 that correspond to objects in the object database 28.

A software-based communication process 32 delivers the selected sample objects and current results objects to the user for study and feedback. The communication process 32 may comprise one or more networking processes used for communication among processes running on different processing devices (not shown). The presentation and labeling process 34 presents the sample objects to the user and solicits user feedback as to the relevance of the sample objects to the user query concept. In one embodiment, the sample objects comprise images, and the user views the sample images on his or her visual display device, such as a computer display screen. The user electronically labels the sample images so as to indicate which sample images match the user's query-concept (positive label) and which do not (negative label). Note that the user's labeling may be implicit. For instance, in one embodiment, samples that are not explicitly labeled as positive are implicitly presumed to have been labeled as negative. In other embodiments, the user may be required to explicitly label samples as positive and negative, and no implication is drawn from a failure to label.

Next, the communication process 32 receives the label information and forwards the label information to a software-based expression retrieval process 36 that retrieves from the expression database 30, expressions that correspond to the positive and negative labeled samples. A software-based comparison process 38 compares the expressions for the positive labeled sample objects with a k-CNF to determine whether there are disjunctive terms of the k-CNF that are candidates for removal based upon differences between the k-CNF and the positive labeled samples. A software-based comparison process 40 compares the negative labeled sample objects with the k-DNF to determine whether there are conjunctive terms of the k-DNF that are candidates for removal based upon differences between the k-DNF and the negative labeled samples. A software-based adjustment process 42 adjusts the k-CNF by removal of disjunctive terms that meet a prescribed measure of difference from the positive labeled sample objects. A software-based adjustment process 44 adjusts the k-DNF by removal of conjunctive terms that meet a prescribed measure of difference from the negative labeled sample objects.

A software-based progress evaluation process 46 evaluates whether the QCS and the CCS have converged or collapsed such that the overall query-concept learner process is finished. If the overall process is not finished then the progress evaluation process 46 returns control to the software-based sample selection process 26. The overall process, therefore, runs recursively until the adjustment of the QCS, through changes in the k-CNF, and the adjustment of the CCS, through changes in the k-DNF, result in a collapsing or convergence of these two spaces, either of which (collapsing or converging) extinguishes the query concept sample space from which samples are selected.

1.2 A Simple Illustrative Example

The following is a relatively simple hypothetical example that illustrates the need for a query-concept learner process and associated computer program based apparatus in accordance with the invention. This simple example is used throughout this specification to explain various aspects of our process and to contrast the process with others. This hypothetical example has a relatively simple feature set, and therefore, is useful for explaining in more simple terms certain aspects of the learner process. Although the learner process is being introduced through a simple example, it will be appreciated that the learner process is applicable to resolve query concepts involving complex feature sets. More specifically, in Section 11, the MEGA query-concept learner is shown to work well to learn complex query concepts for a high dimensional image dataset.

Suppose Jane plans to apply to graduate school. Before filling out the forms and paying the application fees, she would like to estimate her chances of being admitted. Since she does not know the admission criteria, she decides to learn the admission concept by induction. She calls up a few friends who applied last year and obtains the information shown in Table 1.

TABLE 1

Admission Samples.

| Name | GPA | GRE | Has Publications? | Is Athletic? | Was Admitted? |
|---|---|---|---|---|---|
| Joe | high | high | false | true | true |
| Mary | high | low | true | false | true |
| Emily | high | low | true | true | true |
| Lulu | high | high | true | true | true |
| Anna | low | low | true | false | false |
| Peter | low | high | false | false | false |
| Mike | high | low | false | false | false |
| Pica | low | low | false | false | false |

This example may seem very different from, say, an image search scenario, where a user queries similar images by example(s). But if we treat the admission officer as the user who knows what he/she likes and who can, accordingly, label data as true or false, and if we treat Jane as the search engine who tries to find out what the admission officer thinks, then it is evident that this example represents a typical search scenario.

If we look at the GRE scores in the table, we see that students with either high or low GRE scores were admitted, also that both kinds were rejected. Hence, we may conclude that the GRE is irrelevant in the admission process. Likewise, one's publication record does not affect admission acceptance, nor does having a high GPA. It may appear that the admission decision is entirely random. However, the graduate school actually uses a combination of reasonable criteria: it requires a high GPA and either a high GRE or publications. In other words, Admission: GPA=high $\wedge$ (GRE=high V Publications=true).

Two questions arise: "Are all the samples in Table 1 equally useful for learning the target concept?" and, "Are all features in the table relevant to the learning task?" The first question pertains to the sample selection process (S-stage). The second question pertains to the feature reduction process (F-stage).

The S-stage asks whether all samples are equally useful. Apparently not, for several reasons. First, it seems that Pica's record may not be useful since she was unlikely to be admitted (i.e., her record is unlikely to be labeled positive). Second, both Emily and Mary have the same record, so one of these two records is redundant. Third, Lulu's record is perfect and hence does not provide additional insight for learning the admission criteria. This example indicates that choosing samples randomly may not produce useful information for learning a target concept.

The F-stage asks whether all features are relevant. To determine relevancy, we examine the features in the table. The feature "Is athletic?" does not seem to be relevant to graduate admissions. The presence of irrelevant features can slow down concept learning exponentially [10, 11].

The following sections show how and why a query-concept learner process in accordance with the present invention can quickly learn a target (user) concept like the example of admission criteria whereas other methods may not. It will also be shown that a concept learner in accordance with a present embodiment can tolerate noise, i.e., it works well even when a target concept is not in the k-CNF and even when training data contain some errors (e.g., the user inaccurately selects samples). In addition, it will be shown that a multi-resolution/hierarchical learning approach in accordance with one embodiment of the invention can drastically reduce learning time and make the new query-concept learner effective when it "learns" a concept in very high dimensional spaces.

1.3 Definitions and Notations

A query-concept learner in accordance with one embodiment of the invention models query concepts in k-CNF and uses k-DNF to guide the sampling process.

Definition 1: k-CNF: For constant, k, the representation class k-CNF consists of Boolean formulae of the form $c_1 \wedge \ldots \wedge c_\theta$, where each $c_j$ is a disjunction of at most k literals over the Boolean variables $x_1, \ldots, x_n$. No prior bound is placed on $\theta$.

Definition 2: k-DNF: For constant k, the representation class k-DNF consists of Boolean formulae of the form $d_1 \vee \ldots \vee d_\theta$, where each $d_j$ is a conjunction of at most k literals over the Boolean variables $x_1, \ldots, x_n$. No prior bound is placed on $\theta$.

In a retrieval system in accordance with a present embodiment of the invention, queries are Boolean expressions comprising predicates connected by the Boolean operators V (or) and $\wedge$ (and). A predicate on attribute $x_k$ in a present system is in the form of $P_{x_k}$. A database system comprises a number of predicates. The approach to identifying a user's query-concept in accordance with a present embodiment of the invention is to find the proper operators to combine individual predicates to represent the user's query concept. In particular, a k-CNF format is used to model query concepts, since it can express most practical queries and can be learned via positive-labeled samples in polynomial time [8, 13]. In addition, in a present embodiment of the invention, non-positive-labeled samples are used to refine a sampling space, which shall be discussed in detail in Section 2.

A k-CNF possesses the following three characteristics:
1: The terms (or literals) are combined by the $\wedge$ (and) operator.
2: The predicates in a term are combined by the V (or) operator.
3: A term can have at most k predicates.

Suppose we have three predicates $P_{x_1}$, $P_{x_2}$, and $P_{x_3}$. The 2-CNF of these predicates is $P_{x_1} \wedge P_{x_2} \wedge P_{x_3} \wedge (P_{x_1} V P_{x_2}) \wedge (P_{x_1} V P_{x_3}) \wedge (P_{x_2} V P_{x_3})$.

1.4 A General Distance Function

To find objects that are similar to a k-CNF concept, similarity between objects and the concept is measured. Similarity is first measured at the predicate level and then at the object level. At the predicate level, we left $F_{x_k}(i,\beta)$ be the distance function that measures the similarity between object i and concept $\beta$ with respect to attribute $x_k$. The similarity score $F_{x_k}(i,\beta)$ can be normalized by defining it to be between zero and one. Let $P_{x_k}(i,\beta)=0$ denote the normalized form. $P_{x_k}(i,\beta)=0$ means that object i and concept $\beta$ have no similarity with respect to attribute $x_k$, and $P_{x_k}(i,\beta)=1$ means that the objects with respect to $x_k$ are the same.

Suppose a dataset contains N objects, denoted as $O_i$, where i=1 ... N. Suppose each object can be depicted by M attributes, each of which is denoted by $x_k$, where k=1> . . . M. At the object level, standard fuzzy rules, as defined by Zadeh [4, 21], can be used to aggregate individual predicates' similarity scores. An M-tree aggregation function that maps $[0, 1]^M$ to $[0, 1]$ can be used to combine M similarity scores into one aggregated score. The rules are as follows:

Conjunctive rule: $P_{x_1} \wedge x_2 \wedge \ldots \wedge x_M (i, \beta) = \min \{P_{x_1}(i, \beta), P_{x_2}(i, \beta), \ldots P_{x_m}(i, \beta)\}$.

Disjunctive rule: $P_{x_1} V x_2 V \ldots V x_M (i, \beta) = \max \{P_{x_1}(i, \beta), P_{x_2}(i, \beta), \ldots P_{x_M}(i, \beta)\}$.

Thus, in general, a distance function can be used to measure the distance, or conversely the similarity, between two objects or the distance, or similarity, between a concept and an object or between two objects. In one embodiment of the invention, a distance function may be used in two ways during the concept learner process. First, a distance function may be used to select current results that satisfy a current understanding of a user query concept as evidenced by a QCS, for example. More specifically, in one embodiment of the invention, the presentation and user labeling process 34 presents both sample images and current results images to a user side-by-side in a visual display. The current results images are selected by the select current results process 27 using a distance function. Basically, the current results images are selected based on their distance/similarity to the current concept indicated by the current QCS/CCS, for example.

Second, a distance function may be used to select additional results that are similar to, or conversely, not too distant from one or more of the current results. For instance, in the course of the learning process, a current result may be presented that the user desires to explore further. In one embodiment, the samples comprise images and current results also comprise images. The sample images and the current results images are presented side-by-side on a display screen. FIGS. 3–9 show a series of display screens presented to a user during an example user query learner process. The example process progresses in order from the display of FIG. 3 to the display of FIG. 9. The samples are presented on the left side, the current results are presented on right side. A user may wish to retrieve additional images similar to one or more of the presented current results images. A distance function is used to identify additional images like a current results image selected by the user.

Note that identifying current results that are similar to a current user query concept or that are similar to other current results is not the same as the sample selection process used during the S-stage.

To assist the reader, Table 2 summarizes the parameters that have been introduced and that will be discussed in this document.

TABLE 2

Parameters.

| Parameter | Description |
|---|---|
| U | Unlabeled dataset |
| M | The number of attributes for depicting a data object |
| N | The number of data objects in U |
| u | A set of samples selected from the unlabeled set U |
| $\chi_I$ | The $i^{th}$ attribute |
| $O_j$ | The $j^{th}$ object |
| $Y_j$ | The label of the $j^{th}$ object |
| y | The labeled set u |
| $y^+$ | The positive-labeled set |
| $y^-$ | The negative-labeled set |

TABLE 2-continued

Parameters.

| Parameter | Description |
|---|---|
| QCS | The set representation of the query concept space in k-CNF |
| CCS | The set representation of the candidate concept space in k-DNF |
| $d_I$ | The $i^{th}$ disjunctive term in QCS |
| $c_I$ | The $i^{th}$ conjunctive term in QCS |
| $t_I$ | $d_i$ or $c_I$ |
| $F_{x_k}(i, \beta)$ | Distance measure between $O_i$ and QCS with respect to $\chi_k$ |
| $P_{x_k}(i, \beta)$ | Normalized $F_{x_k}(i, \beta)$ |
| $P_{t_k}(i, \beta)$ | Normalized $F_{t_k}(i, \beta)$ |
| $P_{t_i\|y_j}$ | The probability of removing term $t_i$ given $y_j$ |
| $P_{t_i\|y}$ | The probability of removing term $t_i$ given y |
| $K\alpha$ | Sample size |
| $K_c$ | The threshold of eliminating a conjunctive term $c_I$ |
| $K_d$ | The threshold of eliminating a disjunctive term $d_i$ |
| $\gamma$ | Voting parameter |
| f( ) | Func. computing the prob. of removing term $t_i$ given $y_j$ |
| Vote( ) | Func. computing the aggregated probability of removing $t_i$ |
| Sample( ) | Sampling func., which selects u from U |
| Feedback( ) | Labeling funtion |
| Collapsed?( ) | The version space has collapsed? true or false |
| Converged?( ) | The verison space has converged? true or false |

2.0 Overview of the MEGA User Query-Concept Learner Process

This section describes how a user query-concept learner process in accordance with a present embodiment of the invention operates. Sections 4–8 discuss how a process in accordance with a present embodiment deals with very large database issues such as high dimensional data and very large datasets.

The query-concept learning process includes the following parts:

Initialization: Provide users with a reasonable way to convey initial hints to the system.

Refinement: Refine the query concept based on positive-labeled instances. The refinement step is carefully designed to tolerate noisy data.

Sampling: Refine the sampling space based on negative-labeled instances and select samples judiciously for expediting the learning process.

The overall logical flow of the MEGA query-concept learner process, in accordance with one embodiment of the invention, is set forth below in general terms.

Definition 3:

Converged? (QCS, CCS)

Converged? (QCS, CCS)←true if CCS==QCS; false otherwise.

Definition 4:

Collapsed? (QCS, CCS)

Collapsed? (QCS, CCS)←true if CCS E QCS; false otherwise.

Process MEGA

Input: U, $K_c$, $K_d$, $K_a$;

Output: QCS;

Procedure calls: f( ), Vote( ), Sample( ), Feedback( ), Collapsed?( ), Converged?( );

Variables: u, y, U, $P_{x_k}(i,\beta)$, $P_{t_k}(i,\beta)$;

Begin

1 Initialize the version space

QCS←{$d_1, d_2, \ldots$}; CCS←{$c_1, c_2 \ldots$};

2 Refine query concept via relevance feedback
   While (not Collapsed?(QCS, CCS) and not Converged?
      (QCS, CCS))
2.a S-stage: sample selection
   u←Sample(QCS, CCS, U, $K_a$);
2.b Solicit user feedback
   For each $u_i \in u$
   $y_i$←Feedback($u_i$);
2.c F-stage: feature reduction
2.c.1 Refine k-CNF using positive samples
   For each $d_i \in QCS$
   For each $y_i \in y^+$
   $P_{d_i|y_j}$←$f(d_i, O_j, QCS)$;
   $P_{d_i|y^+}$←Vote($y^+$, $P_{d_i|y_j \in y^+}$, γ)
   If ($P_{d_i|y^+} > K_d$)
   QCS←QCS−{$d_j$};
2.c.2 Refine k-DNF using negative samples
   For each $c_i \in CCS$
   For each $y_j \in y^-$
   $P_{c_i|y_j}$←$f(c_i, O_j, CCS)$;
   $P_{c_i|y^-}$←Vote($y^-$, $P_{c_i|y_j \in y^-}$, γ);
   If ($P_{c_i|y^-} > K_c$)
   CCS−CCS−$f${$c_j$};
2.d Bookkeeping
   U←U−u;
3 Return query concept
   output QCS;
End Sub-process 2.a: This is the sample selection process, i.e., the S-stage. The sample process selects samples from the unlabeled pool U. The unlabeled pool contains samples that have not yet been labeled as matching or not matching the current user query-concept. This step passes QCS, CCS, and U to procedure Sample to generate $K_a$ samples. In the present embodiment of the invention QCS is modeled as a k-DNF, and CCS is modeled as a k-DNF. Therefore, the k-CNF and k-DNF are passed to procedure sample. The procedure Sample is discussed in Section 2.3.

Sub-process 2.b: This process solicits user feedback. A user marks an object positive if the object fits his/her query concept. An unmarked object is considered as having been marked negative by the user. As the query-concept learner process proceeds in an attempt to learn a query concept, it will submit successive sets of sample images to the user. If the attempt is successful, then the sample images in each successive sample set are likely to be progressively closer to the user's query concept. As a result, the user will be forced to more carefully refine his or her choices from one sample image set to the next. Thus, by presenting sets of samples that are progressively closer to the query concept, the query-concept learner process urges the user to be progressively more selective and exacting in labeling samples, as matching or not matching the user's current query-concept.

Sub-process 2.c: This is the feature reduction process, i.e. the F-stage. It refines QCS and CCS.

Sub-process 2.c.1: This process refines QCS. For each disjunctive term in the k-CNF, which models the QCS, the feature reduction process examines each positive-labeled sample and uses function $f$ to compute the probability that the disjunctive term should be eliminated. The feature reduction process then calls procedure Vote to tally the votes among the positive-labeled sample images and compares the vote with threshold $K_d$ to decide whether that disjunctive term predicate is to be removed. According to the procedure vote, if sufficient numbers of positive-labeled samples are different from the QCS with respect to a disjunctive term predicate (i.e., if the threshold is exceeded), the predicate is removed from the QCS. In a present embodiment of the invention, the procedure Vote, which decides how aggressive the feature reduction process is in eliminating terms, is described in Sections 2.3.1–2.3.2.

Sub-process 2.c.2: This process refines CCS. Similar to Sub-process 2c.1, for each conjunctive term in the CCS, modeled a k-DNF, the feature reduction process examines each negative-labeled sample, and uses function $f$ to compute the probability that the conjunctive term predicate should be eliminated. The feature reduction process then calls procedure Vote to tally the votes among the negative-labeled samples. Then it compares the vote with threshold $K_c$ to decide whether that conjunctive term is to be removed from the k-DNF. According to the procedure vote, if sufficient numbers of negative-labeled instances satisfy the k-DNF with respect to a conjunctive term predicate, the predicate is removed from the k-DNF.

Step 2.d: This process performs bookkeeping by reducing the unlabeled pool.

The refinement step terminates when the learning process converges to the target concept (Converged?=true) or the concept is collapsed (Collapsed?=true). (Converged? and Collapsed? are defined below.) In practice, the refinement stops when no unlabeled instance u can be found in the user query concept sample space between the QCS and the CCS.

2.1 Initialization

In order to more efficiently initiate the process of learning a query concept, a user may engage in a preliminary initialization process aimed at identifying an efficacious, sensible, and reasonable starting point for the concept learner process. The objective of this initialization process is to garner a collection of samples to be presented to the user to elicit a user's initial input as to which of the initial samples matches a user's current query concept. It will be appreciated that there may be a very large database of samples available for presentation to the user. In a current embodiment, the samples comprise images that can be presented to a user visually using a computer display screen, for example. The question addressed by the initialization process is, "Where to start the concept learner process?"

A concept learner process according to the present invention proceeds based upon the user's indication of which samples match, or at least are close to, the user's current query concept and which do not match, or at least are not close to the user's current query concept. Where the samples comprise images, the initialization process aims to identify an initial set of sample images that are likely to elicit a response from the user that identifies at least some of the initial sample images as matching or at least being close to the user's query concept and that identifies other of the initial sample images as not matching or at least not being close to the user's query concept. Thus, the initialization process aims to identify an initial collection of sample images with at least some sample images that match the user's query concept and some that do not match the user's query concept.

As part of the initialization process, the user is requested to provide some indication of what he or she is looking for. This request, for example, may be made by asking the user to participate in a key word search or by requesting the user to choose from a number of different categories of subject matter by clicking on different images, for example. The manner in which this initial indication is elicited from the user is not important provided that it does not frustrate the user by taking too long or being too difficult and provided that it results in an initial set of samples in which some are likely to match the user's current query concept and some are not. It is possible that in some cases, more than one initial set of samples will be presented to the user before there are both initial samples that match the user's query concept and samples that do not match.

It will be appreciated that the initialization step is not critical to the practice of the invention. It is possible to launch immediately into the query concept learner process without first identifying some samples that do and some samples that do not match the user's current query concept. However, it is believed that the initialization process will accelerate the concept learner process by providing a more effective starting point.

Thus, a user who cannot specify his/her query concept precisely can initially give the concept learner process some hints to start the learning process. It is believed that this bootstrapping initialization process is more practical than that of most traditional multimedia search engines, which make the unrealistic assumption that users can provide "perfect" samples (e.g., keywords) to perform a query. A present embodiment of bootstrapping initialization process aims to develop a set of samples to the user. This initialization process, therefore, bootstraps the query concept learner process by developing an initial positive-labeled sample set and an initial negative-labeled sample set.

2.2 Sampling

The query-concept learner process invokes procedure Sample to select the next $K_a$, unlabeled instances to ask for user feedback. From the college-admission example presented in Section 1.2, we learn that if we would like to minimize our work (i.e., call a minimum number of friends), we should choose our samples judiciously. But, what constitutes a good sample? We know that we learn nothing from a sample if It agrees with the concept in all terms.

It has the same attributes as another sample.

It is unlikely to be labeled positive.

To make sure that a sample is useful, the query-concept learner process employs at least two broad strategies:

1. Bounding the sample space: The learner process avoids choosing useless unlabeled instances by using the CCS and QCS to delimit the sampling boundary. The sample space bounded by the CCS and the QCS is referred to herein as the user query concept sample space.

2. Maximizing the usefulness of a sample: The learner process chooses a sample that is expected to remove the maximum expected number of disjunctive terms. In other words, the learner process chooses a sample that can maximize the expected generalization of the concept.

The query-concept learner process employs an additional secondary strategy to facilitate the identification of useful samples:

3. Clustering of samples: Presenting to a user multiple samples that are too similar to one another generally is not a particularly useful approach to identifying a query concept since such multiple samples may be redundant in that they elicit essentially the same information. Therefore, the query-concept learner process often attempts to select samples from among different clusters of samples in order to ensure that the selected samples in any given sample set presented to the user are sufficiently different from each other. In a current embodiment, samples are clustered according to the feature sets manifested in their corresponding expressions. There are numerous processes whereby the samples can be clustered in a multi-dimensional sample space. For instance, U.S. Provisional Patent Application, Ser. No. 60/324,766, filed Sep. 24, 2001, entitled, Discovery Of A Perceptual Distance Function For Measuring Similarity, invented by Edward Y. Chang, which is expressly incorporated herein by this reference, describes clustering techniques. For example, samples may be clustered so as to be close to other samples with similar feature sets and so as to be distant from other samples with dissimilar feature sets. Clustering is particularly advantageous when there is a very large database of samples to choose from. It will be appreciated, however, that there may be situations in which it is beneficial to present to a user samples which are quite similar, especially when the k-CNF already has been significantly refined through user feedback.

Applying these strategies in one embodiment of the invention, samples are selected from the query concept sample space, which is bounded by the CCS and the QCS. In order to be effective in eliciting useful user feedback, an expression representing a sample should be close to but not identical to the k-CNF. The question of how close to the k-CNF a sample's expression should be is an important one. That difference should be carefully selected if the learner process is to achieve optimal performance in terms of rapid and accurate resolution of a query-concept.

More specifically, it may appear that if we pick a sample that has more dissimilar disjunctions (compared to the QCS), we may have a better chance of eliminating more disjunctive terms. This is, however, not true. In one embodiment, a sample must be labeled by the user as positive to be useful for refining k-CNF which models the QCS. In other words, a user must indicate, either expressly or implicitly, that a given sample matches the user's query concept in order for that sample to be useful in refining the QCS. Unfortunately, a sample with more disjunctions that are dissimilar to the target concept is less likely to be labeled positive. Therefore, in choosing a sample, there is a trade off between those with more contradictory terms and those more likely to be labeled positive.

2.2.1 Estimation of Optimal Difference Between Sample and QCS During Sample Selection One of the criteria for selecting a sample is the closeness of the sample to the QCS, which is modeled as a k-CNF. A measure of the closeness of a sample to the k-CNF is the number of predicate features in the sample's expression that differ from corresponding predicates of the k-CNF. Thus, one aspect of optimizing a query-concept learner process is a determination of the optimum difference between a sample and a k-CNF as measured by the number of predicates of the sample's expression that differ from corresponding predicates of the k-CNF. As explained in the following sections, this optimum number is determined through estimation.

More specifically, let $\psi$ denote the number of disjunctions remaining in the k-CNF. The number of disjunctions that can be eliminated in the current round of sampling (denoted as $\psi$) is between zero and $\psi$. We can write the probability of eliminating P terms as $P_e(\psi)$. $P_e(\psi)$ is a monotonically decreasing function of $\psi$.

The query-concept learner process can be tuned for optimal performance by finding the P that can eliminate the maximum expected number of disjunctive terms, given a sample. The objective function can be written as $$\psi^* = \text{argmax}_\psi E(\psi) = \text{argmax}_\psi (\psi \times P_e(\psi)). \quad (1)$$

To solve $\psi^*$, we must know $P_e(\psi)$, which can be estimated by the two methods described below: probabilistic estimation and empirical estimation.

2.2.2 Probabilistic Estimation

We first consider how to estimate $\psi^*$ using a probability model. As we have seen in the college-admission example, if a sample contradicts more disjunctive terms, it is more likely to be labeled negative (i.e., less likely to be labeled positive). For example, a sample that contradicts predicate $P_1$, is labeled negative only if $P_1$ is in the user's query concept. A sample that contradicts both predicates $P_1$ and $P_2$ is labeled negative if either $P_1$ or $P_2$ is in the user's query concept.

Formally, let random variable $\Phi_i$ be 1 if $P_i$ is in the concept and 0 otherwise. For simplicity, let us assume that the $\Phi_i$'s are iid (independent and identically distributed), and the probability of $\Phi_i$ being 1 is p (0<p<1). The probability of a sample contradicting $\psi$ disjunctive terms is marked positive only when none of these $\psi$ terms appears in the user's query concept. This probability is $(1-p)^\psi$. If we substitute $P_e(\psi)$ by $(1-p)^\psi$ on the right-hand side of Equation 1, we get $$\max E(\psi) = \psi(1-p)^\psi.$$

If we take the derivative of $E(\psi)$, we can find the optimal $\psi$ value, denoted by $\psi^*$:

$$\psi^* = \Psi, \text{ if } \frac{1}{\ln\frac{1}{1-p}} > \Psi,$$

$$\psi^* = \frac{1}{\ln\frac{1}{1-p}}, \text{ otherwise.}$$

Of course, it may be too strong an assumption that the probability p of all disjunctions is iid. However, we do not need a precise estimation here for the following two reasons:

1. Precise estimation may not be feasible and can be computationally intensive.
2. An approximate estimation is sufficient for bootstrapping. Once the system is up and running for a while and collects enough data, it can empirically estimate $P_e(\psi)$ using its past experience. We discuss this process next.

2.2.3 Empirical Estimation

The probability of eliminating P terms, $P_e(\psi)$, can be estimated based on its past experience of the learner process. For each sample the learner process presents, a record can be created which sets forth how many disjunctions the sample contradicts with respect to the query concept and whether the sample is labeled positive. Once a sufficient amount of data has been collected, we can estimate $P_e(\psi)$ empirically. We then pick the $\psi^*$ that can eliminate the maximum expected number of disjunctive terms.

Again, a reasonable approach to estimate $P_e(\psi)$ is to use probabilistic estimation when the learner process first starts and then to switch to empirical estimation when the sufficient data has been collected. The transition from probabilistic estimation to empirical estimation takes place gradually and only after numerous users have employed the query-concept learner process. This transition does not occur during the course of a single user session.

Moreover, an abrupt transition from one estimation approach to the other could be problematic, since the two estimates of $P_e(\psi)$ may differ substantially. This could lead to a sudden change in behavior of the sampling component of the active learner. To remedy this problem, we employ a Bayesian smoothing approach. Essentially the probabilistic estimation is the prior guess at the distribution over $\psi$ and the empirical approach is the guess based purely on the data that has been gathered so far. The Bayesian approach combines both of these guesses in a principled manner. Before we start, we imagine that we have seen a number of samples of $\psi$. After refinement iteration, we gather new samples for $\psi$; then we add them to our current samples and adjust $P_e(\psi)$.

For example, before we start, we assume that we have already seen samples with $\psi=1$ being labeled positive three out of five times and samples with $\psi=2$ being labeled positive seven out of 20 times. In other words, we have successfully eliminated $\psi=1$ term three times out of five, and we have successfully eliminated $\psi=2$ terms 7 times out of 20. Thus initially $P_e(\psi=1)=3/5=0.6$ and $P(\psi=2)=7/20=0.35$. Now suppose we do a query and in which we observe a sample with, $\psi=2$ being labeled positive. Then our new distribution is $P(\psi=1)=3/5$ and $P(\psi=2)=8/21$. We continue in this manner. At first, the prior assumption has quite an effect on our guess about the distribution. The more imaginary samples we have in our prior assumption, the larger its effect. For instance, if we assume that $\psi=1$ being labeled positive 30 out of 50 times and that $\psi=2$ being labeled positive 70 out of 200 times, it takes more real samples to change $P_e(\psi)$. With time, the more real samples we get, the less the effect of the prior assumption becomes, until eventually it has virtually no effect, and the observed data dominate the expression. This procedure gives us a smooth transition between the "probabilistic" and the "empirical" methods.

2.3 Refinement

Valiant's learning algorithm [19] is used as the starting point to refine a k-CNF concept. We extend the algorithm to:

1. Handle the fuzzy membership functions (Section 1.3),
2. Select samples judiciously to expedite the learning process (Sections 2.2–2.2.3), and
3. Tolerate user errors (Sections 2.3.1–2.3.2).

The query-concept learner process initializes a query concept space (QCS) as a k-CNF and a candidate concept space (CCS) as a k-DNF. The QCS starts as the most specific concept and the CCS as the most general concept. The target concept that query-concept learner process learns is more general than the initial QCS and more specific than the initial CCS. The query-concept learner process seeks to refine the QCS, while at the same time refining the CCS to delimit the boundary of the sampling space.

FIG. 2 is an illustrative drawing that represents in conceptual terms the relationship between a QCS and a CCS. The shaded area in FIG. 2 shows a user query concept sample space between the QCS and the CCS. The user query concept sample space is defined as the space between CCS and QCS.

User feedback is used in the refinement of the QCS and the CCS. More specifically, user's indications of which sample images meet the user's current query-concept and which sample images do not meet the user's current query-concept are used as a basis for refinement of the QCS and the CCS, and therefore, as a basis for refinement of the query concept sample space which is bounded by the QCS and the CCS. One function in the refinement process is to evaluate whether or not a disjunctive term should be removed from the QCS which is modeled as a k-CNF. Another function in the refinement process is to evaluate whether a conjunctive term should be removed from the CCS which is modeled as a k-CNF. In a present embodiment of the invention, removal of a disjunctive term from the k-CNF involves identifying the level of difference, with respect to the term in question, between the k-CNF and the expressions for the one or more sample images indicated as matching the user's query-concept. Similarly, with regard to removal of a conjunctive term from the k-CNF, the way in which the function proceeds is to identify the level of difference, with respect to the term in question, between the k-DNF and the expressions for the one or more sample images indicated as not matching the user's query-concept. The specific approach to the employment of user feedback to refine the QCS and the CCS is a Procedure Vote described below in sections 2.3.1–2.3.2.

2.3.1 Procedure Vote

A Procedure Vote employed in a present embodiment functions to refine the QCS and CCS while also accounting for model bias and user errors. More specifically, in the previous example, we assume that all samples are noise-free. This assumption may not be realistic. There can be two sources of noise:

Model bias: The target concept may not be in k-CNF.

User errors: A user may label some positive instances negative and vice versa.

A Procedure Vote process in accordance with one embodiment of the invention can be explained in the following general terms.

Input: y, $P_{t_i|v_j \in y}$, γ;
Output: $P_{t_i|v_j}$;
Begin
Sort $P_{t_i|v_j}$ in the descending order;
Return the $\gamma^{th}$ highest $P_{t_i|v_j}$;
End Thus, the Procedure Vote controls the strictness of voting using γ. The larger the value of γ is, the more strict the voting is and therefore the harder it is to eliminate a term. When the noise level is high, we have less confidence in the correctness of user feedback. Thus, we want to be more cautious about eliminating a term. Being more cautious means increasing γ. Increasing γ, however, makes the learning process converge more slowly. To learn a concept when noise is present, one has to buy accuracy with time.

2.3.2 Procedure Vote Example

In a present embodiment, a measure of difference between a term of the k-CNF and a measure of difference between a sample expression and between a k-DNF and a sample expression can be prescribed. More specifically, a parameter γ is the required number of votes to exceed a threshold, either $K_c$ (k-CNF) or $K_d$ (k-DNF). The value γ is a positive integer. The values $K_c$ and $K_d$ are values between zero and one. Suppose for example that we have three positive labeled instances y1, y2 and y3. Assume that c1 is a single-predicate disjunctive term meaning that the color feature high-saturated red is true. Suppose that the QCS has a value of 1 on c1. Suppose that c1, c2, and c3 have values on c1 of 0.1, 0.2, and 0.3, respectively. The distance (i.e., the probability to remove) of y1 from the QCS with respect to c1 is 0.9. The distance of y2 from the QCS with respect to c1 is 0.8. The distance of y3 from the QCS with respect to c1 is 0.7.

Now, for example, suppose $K_c=0.85$. Based on the above hypothetical, then if γ=1, then c1 is removed from the QCS because at least one sample image, y1, differs from the QCS with respect to c1 by an amount greater than the threshold $K_c$. However, if γ=2, then c1 is not removed from the QCS because there are not two sample images that differ from the QCS with respect to c1 by an amount greater than the threshold $K_c$. As explained above the differences from QCS of y1, y2 and y3 with respect to c1 are 0.9, 0.8 and 0.7, respectively. Only one of these exceeds the threshold of $K_c=0.85$. Therefore, if γ=2, then c1 is not removed from the QCS.

The Procedure Vote operates in an analogous fashion to determine whether or not to remove conjunctive terms from a CCS based upon γ and $K_d$.

Thus, it will be appreciated that γ has a value selected to establish the strictness of the removal process. The value of γ establishes the prescribed number of sample objects that must have a given term that is different from the same term of the k-CNF in order to determine to remove that term from the k-CNF. Conversely, the value of γ establishes the prescribed number of sample objects that must have a given term that is not different from the same term of the k-DNF in order to determine to remove that term from the k-DNF. Note that the value of γ need not be the same for k-CNF determinations and k-DNF determinations.

It will be understood that the Procedure Vote, in accordance with one embodiment, provides a way to measure the difference between individual terms of a sample object, indicated as close to the user's concept, and corresponding terms of the k-CNF. If an individual term of a sample object differs from a corresponding term of the k-CNF by at least a prescribed amount, then the terms are identified as different from each other. For instance, in the above example $K_c$ sets the prescribed difference in the predicate for the color feature high-saturated red as 0.85. If a predicate feature of a sample object differs from a corresponding predicate feature of a k-CNF by 0.85 or more, then the $K_c$ threshold is surpassed, and the sample object and the k-CNF are identified as different as to that predicate feature.

In addition, the Procedure Vote also provides the criteria for determining whether to remove a term from a k-CNF that has been identified as different from corresponding terms of one or more sample objects. If an individual term of the k-CNF is identified as different from the corresponding predicate features of a prescribed number of sample objects, indicated as close to the user's concept, then the term is removed from the k-CNF. For instance, in the above example, if γ=1, then if at least one predicate feature of a sample object that is close to the user's concept is identified as different from a corresponding single-predicate term of the k-CNF, then that term is removed from the k-CNF.

Conversely, the Procedure Vote provides a way to identify terms to be removed from the k-DNF. According to the above example, if a predicate feature of a sample object, indicated to be not close to the user's query concept, is not different from a corresponding single-predicate term of a k-DNF by at least a prescribed threshold amount $k_d$, then that sample object is determined to be not different from the k-DNF in that term. If at least γ sample objects have a predicate feature that does not differ from the same corresponding single-predicate term of the k-DNF, then that single-predicate term is determined to be removed from the k-DNF.

For multiple-predicate terms of a k-CNF, the difference of each predicate from a corresponding predicate feature of a sample expression is assessed for each positive sample. For example, consider the k-CNF disjunctive term ($c_1$ OR $c_2$) in which "OR" represents the logical "or" function, and $c_1$ is the predicate for the color feature high-saturated red, and $c_2$ is the predicate for the color feature high-saturated blue. The predicate $c_1$ is removed from the ($c_1$ OR $c_2$) k-CNF disjunctive term if there are at least γ positive labeled samples in which the sample's predicate $c_1$ differs from the corresponding k-CNF valued by $K_{dc1}$. Similarly, the predicate $c_2$ is removed from the ($c_1$ OR $c_2$) k-CNF disjunctive term if there are at least γ positive labeled samples in which the sample's predicate $c_2$ differs from the corresponding k-CNF value by $K_{dc2}$. The values $K_{dc1}$ and $K_{dc2}$ are threshold values for the predicates $c_1$ and $c_2$, respectively.

Conversely, for example, consider the k-DNF conjunctive term ($c_1$ AND $c_2$) in which "AND" represents the logical "and" function, and $c_1$ and $c_2$ are the same as in the above example. The predicate $c_1$ is removed from the ($c_1$ AND $c_2$) k-DNF conjunctive term if there are at least γ negative labeled samples in which the sample's predicate $c_1$ does not differ from the k-DNF value by $K_{cc1}$. Similarly, the predicate $c_2$ is removed from the ($c_1$ AND $c_2$) k-DNF conjunctive term if there are at least γ negative labeled samples in which the sample's predicate $c_2$ does not differ from the k-DNF value by $K_{cc2}$. The values $K_{cc1}$ and $K_{cc2}$ are threshold values for the predicates $c_1$ and $c_2$, respectively.

3.0 Another Illustrative Example

Below we show a toy example problem that illustrates the usefulness of the MEGA query-concept learner process. We will use this simple example to explain various aspects of our sampling approach and to contrast our approach with others. This example models a college admission concept that consists of a small number of Boolean predicates. (MEGA also works with fuzzy predicates.)

Suppose Jane plans to apply to a graduate school. Before filling out the forms and paying the application fees, she would like to estimate her chances of being admitted. Since she does not know the admission criteria, she decides to learn the admission concept by induction. She randomly calls up a few friends who applied last year and obtains the information shown in Table 3.

TABLE 3

Admission Samples.

| Name | GPA | GRE | Has Publications? | Was Admitted? |
|---|---|---|---|---|
| Joe | high | high | false | true |
| Mary | high | low | true | true |
| Emily | high | low | true | true |
| Lulu | high | high | true | true |
| Anna | low | low | true | false |
| Peter | low | high | false | false |
| Mike | high | Low | false | false |
| Pica | low | low | false | false |

There are three predicates in this problem, as shown in the table. The three predicates are:

GRE is high,

GPA is high, and

Has publications.

The first question arises: "Are all the random samples in Table 3 equally useful for learning the target concept?" Apparently not, for several reasons. First, it seems that Pica's record may not be useful since she was unlikely to be admitted (i.e., her record is unlikely to be labeled positive). Second, both Emily and Mary have the same record, so one of these two records can be redundant. Third, Lulu's record is perfect and hence does not provide additional insight for learning the admission criteria. This example indicates that choosing samples randomly may not produce useful information for learning a target concept.

Now, let us explain how MEGA's sampling method works more effectively than the random scheme. Suppose CCS and QCS are modeled as 2-CNF and 2-DNF, respectively. Their initial expressions can be written as follows:

QCS=(GRE=high) Λ (GPA=high) Λ (Publications=true) Λ (GRE=high V GPA=high)

Λ (Publications=true V GPA=high) Λ (GRE=high V Publications=true).

CCS=(GRE=high) V (GPA=high) V (Publications=true) V (GRE=high Λ GPA=high)

V (Publications=true Λ GPA=high) V (GRE=high Λ Publications=true).

Suppose ψ* is one. Jane starts by calling her friends whose "profile" fails by exactly one disjunctive term. Jane calls three people and two tell her that they were admitted (i.e., they are the positive-labeled instances) as shown in Table 4.

Based on the feedback, Jane use the positive labeled instances (Joe and Emily) to generalize the QCS concept to QCS=(GPA=high) Λ (Publications=true V GPA=high) Λ (GRE=high V Publications=

TABLE 4

MEGA sampling Rounds.

| Round # | Name | GPA | GRE | Has Publications? | Was Admitted? |
|---|---|---|---|---|---|
| 1st | Joe | high | high | false | true |
|  | Emily | high | low | true | true |
|  | Dora | low | high | true | false |
| 2nd | Kevin | high | low | false | false | true) Λ (GPA=high V GRE=high). At the same time, the CCS is shrunk by using the negative labeled instance (Dora) to CCS=(GPA=high) V (GRE=high Λ GPA=high) V (Publications true Λ GPA=high).

In the second round, Jane attempts to call friends to see if any of the remaining terms can be removed. She calls Kevin, whose profile is listed in the table. Since this sample is labeled negative, the QCS is not changed. But the CCS is reduced to (GRE=high V GPA=high) V (Publications=true Λ GPA=high).

Simplifying and rewriting both QCS and CCS gives us the following identical expression:

QCS=(GPA=high) V (GRE=high V Publications=true).

The concept converges and the refinement terminates at this point. We have learned the admission criterion—a high GPA and either a high GRE or publications.

4.0 Multi-resolution/Hierarchical Learning

The MEGA scheme described so far does not yet concern its scalability with respect to M (the number of features for depicting an object). In this section, we describe MEGA's multi-resolution/hierarchical learning algorithm that tackles the dimensionality-curse problem.

The number of disjunctions in a k-CNF (and, likewise, the conjunctives in a k-DNF) can be written as $$\sum_{i=1}^{k} \binom{M}{i}. \quad (2)$$

When M is large, a moderate k can result in a large number of disjunctive terms in a k-CNF, which causes high space and time complexity for learning. For instance, an image database that we have built [1] characterizes each image with 144 features (M=144). The initial number of disjunctions in a 3-CNF is half a million and in a 4-CNF is eighteen million.

To reduce the number of terms in a k-CNF, we divide a learning task into G sub-tasks, each of which learns a subset of the features. Dividing a feature space into G subspaces reduces both space and time complexity by a factor of $O(G^{k-1})$. For instance, setting G=12 in our image database reduces both space and time complexity for learning a 3-CNF by 140 times (the number of terms is reduced to 3,576), and for learning a 4-CNF by 1,850 times (the number of terms is reduced to 9,516). The savings is enormous in both space and learning time. (The wall-clock time is less than a second for one learning iteration for a 4-CNF concept on a Pentium-III processor.)

This divide-and-conquer approach may trade precision for speed, since some terms that involve features from more than one feature subset can no longer be included in a concept. The loss of precision can be reduced by organizing a feature space in a multi-resolution fashion. The term feature resolution and a weak form of feature resolution that we call feature correlation are defined as follows:

Definition 5: Feature resolution: Feature. $P_i$ is said to have higher resolution than feature $P_j$ if the presence of $P_i$ implies the presence of $P_j$ (or the absence of $P_j$ implies the absence of $P_i$). Let $P_i \in P_j$ denote that $P_i$ has higher resolution than $P_j$. We say that $P_i \in P_j$ if and only if the conditional probability $P(P_j|P_i)=1$.

Definition 6: Feature correlation: A feature $P_i$ is said to have high correlation with feature $P_j$ if the presence of $P_i$ implies the presence of $P_j$ and vice versa with high probability. We say that $P_i-P_j$ if and only if the conditional probability $P(P_j|P_i)|P(P_j)=P(P_i|P_j)|P(P_i) \geq \delta$.

MEGA takes advantage of feature resolution and correlation in two ways—inter-group multi-resolution and intra-group multi-resolution—for achieving fast and accurate learning. Due to the space limitation, we limit our description of the heuristics of MEGA's multi-resolution learning algorithm to the following.

Inter-group multi-resolution features. If features can be divided into groups of different resolutions, we do not need to be concerned with terms that involve inter-group features. This is because any inter-group terms can be subsumed by intra-group terms. Formally, if $P_i$ and $P_j$ belong to two feature groups and $P(P_i|P_j)=1$, then $P_1 \vee P_2 = P_2$ and $P_1 \wedge P_2 = P_1$ Intra-group multi-resolution features. Within a feature group, the more predicates involved in a disjunctive term, the lower the resolution of the term. Conversely, the more number of predicates involves in a conjunctive term, the higher resolution the term is. For instance, in a 2-CNF that has two predicates $P_1$ and $P_2$, term $P_1$ and term $P_2$ have a higher resolution than the disjunctive term $P_1 \vee P_2$ and a lower resolution than the conjunctive term $P_1 \wedge P_2$. The presence of $P_1$ or $P_2$ makes the presence of $P_1 \vee P_2$ useless. Based on this heuristic, MEGA examines a term only when all its higher resolution terms have been eliminated.

5.0 Examples for Multi-resolution Learning

Suppose we use four predicates (i.e., features) to characterize an image. Suppose these four predicates are vehicle, car, animal, and tiger. A predicate is true when the object represented by the predicate is present in the image. For instance, vehicle is true when the image contains a vehicle.

A 2-CNF consisting of these four predicates can be written as the following:

$$\text{vehicle} \wedge \text{car} \wedge \text{animal} \wedge \text{tiger} \wedge (\text{vehicle} \vee \text{car}) \wedge (\text{vehicle} \vee \text{animal}) \wedge (\text{vehicle} \vee \text{tiger}) \wedge (\text{car} \vee \text{animal}) \wedge (\text{car} \vee \text{tiger}) \wedge (\text{animal} \vee \text{tiger}) \quad (1)$$

As the number of predicates increases, the number of terms in a k-CNF can be very large. This large number of terms not only incur a large amount of memory requirement but also a long computational time to process them. To reduce the number of terms, we can divide predicates into subgroups. In general, when we divide a k-CNF into G groups, we can reduce both memory and computational complexity by $G \wedge k-1$ folds. For instance, let k=3 and G=10.

The saving is 100-fold.

Dividing predicates into subgroups may lose some inter-group terms. Suppose we divide the four predicates into two groups: Group one consists of vehicle and car, and group two consists of animal and tiger. We then have the following two sets of 2-CNF:

From group one, we have: vehicle and car and (vehicle or car).

From group two, we have: animal and tiger and (animal or tiger).

When we join these two 2-CNF with an "and" operator, we have:

$$\text{vehicle} \wedge \text{car} \wedge (\text{vehicle} \vee \text{car}) \wedge \text{animal} \wedge \text{tiger} \wedge (\text{animal} \vee \text{tiger}) \quad (2)$$

Comparing expression (2) to expression (1), we lose four inter-group disjunctions: (vehicle V animal), (vehicle V tiger), (car V animal), and (car V tiger).

Losing terms may degrade the expressiveness of k-CNF. However, we can divide the predicates intelligently so that the effect of losing terms is much less significant.

The effect of losing terms is null if we can divide predicates in a multi-resolution manner. Follow the example above. If we divide predicates into group one: (vehicle, animal); and group two: (car, tiger), then the losing terms (vehicle or car), (animal or tiger) do not affect the expressiveness of the k-CNF. This is because car has a higher resolution than vehicle, and (car or vehicle)=car. Likewise, (animal or tiger)=tiger.

We still lose two terms: (vehicle V tiger), (animal V car). However, both terms can be covered by (vehicle V animal) and hence we do not lose significant semantics if features are divided by their resolutions.

6.0 Example: Multi-resolution Processing

Let us reuse the k-CNF in the above example.

$$\text{vehicle} \wedge \text{car} \wedge \text{animal} \wedge \text{tiger} \wedge (\text{vehicle} \vee \text{car}) \wedge (\text{vehicle} \vee \text{animal}) \wedge (\text{vehicle} \vee \text{tiger}) \wedge (\text{car} \vee \text{animal}) \wedge (\text{car} \vee \text{tiger}) \wedge (\text{animal} \vee \text{tiger}) \quad (1)$$

Suppose we have an image example which contains a cat on a tree, and the image is marked positive. We do not need to examine all terms. Instead, we can just first examine the lowest resolution terms. In this case, since the vehicle predicate (low resolution one) is contradicted, we do not even need to examine the car predicate that has a finer resolution than vehicle.

The elimination of the vehicle predicate eliminates all of its higher resolution counterparts, and hence car.

The cat object satisfies the animal predicate. Therefore, the animal predicate is not contradicted. We need to examine the tiger predicate which has a finer resolution than animal. Since tiger is not present, the tiger predicate is eliminated. We have animal retained in the concept.

What is the advantage of examining predicates from low to high resolutions? We do not have to allocate memory for the higher resolution predicates until the lower ones are satisfied. We can save space and time.

7.0 Example: Multiple Pre-cluster Sets of Sample Images

Suppose we have N images. We pre-group these images into M clusters. Each cluster has about N/M images, and the images in each cluster are "similar" to one another. We can pick one image from each cluster to represent the cluster. In other words, we can have M images, one from each cluster, to represent the N images.

Now, if we need to select samples, we do not have to select samples from the N-image pool. We can select images from the M-image pool. Every time when we eliminate one of these M images, we eliminate the cluster that the image represents. Let N=one billion and M=one thousand. The amount of processing speed can be improve by one million-fold.

8.0 Characterizing Images with Expressions Comprising Features Values

Each sample image is characterized by a set of features. Individual features are represented by individual terms of an expression that represents the image. The individual terms are calculated based upon constituent components of an image. For instance, in a present embodiment of the invention, the pixel values that comprise an image are processed to derive values for the features that characterize the image. For each image there is an expression comprising a plurality of feature values. Each value represents a feature of the image. In a present embodiment, each feature is represented by a value between 0 and 1. Thus, each image corresponds to an expression comprising terms that represent features of the image.

The following Color Features Table and Texture Features Table represent the features that are evaluated for images in accordance with a present embodiment of the invention. The image is evaluated with respect to 11 recognized cultural colors (black, white, red, yellow, green, blue, brown, purple, pink, orange and gray) plus one miscellaneous color for a total of 12 colors. The image also is evaluated for vertical, diagonal and horizontal texture. Each image is evaluated for each of the twelve (12) colors, and each color is characterized by the nine (9) color features listed in the Color Table. Thus, one hundred and eight (108) color features are evaluated for each image. In addition, each image is evaluated for each of the thirty-six (36) texture features listed in the Texture Chart. Therefore, one hundred and forty-four (144) features are evaluated for each image, and each image is represented by its own 144 (feature) term expression.

TABLE 5

Color Features

Present %
Hue - average
Hue - variance
Saturation - average
Saturation - variance
Intensity - average
Intensity - variance
Elongation
Spreadness

TABLE 6

Texture Features

| | Coarse | Medium | fine |
|---|---|---|---|
| Horizontal | Avg. Energy | Avg. Energy | Avg. Energy |
| | Energy Variance | Energy Variance | Energy Variance |
| | Elongation | Elongation | Elongation |
| | Spreadness | Spreadness | Spreadness |
| Diagonal | Avg. Energy | Avg. Energy | Avg. Energy |
| | Energy Variance | Energy Variance | Energy Variance |
| | Elongation | Elongation | Elongation |
| | Spreadness | Spreadness | Spreadness |
| Vertical | Avg. Energy | Avg. Energy | Avg. Energy |
| | Energy Variance | Energy Variance | Energy Variance |
| | Elongation | Elongation | Elongation |
| | Spreadness | Spreadness | Spreadness |

The computation of values for the image features such as those described above is well known to persons skilled in the art.

Color set, histograms and texture feature extraction are described in John R. Smith and Shih-Fu Chang, Tools and Techniques for Color Image Retrieval, *IS&T/SPIE Proceedings*, Vol. 2670, Storage & Retrieval for Image and Video Database IV, 1996, which is expressly incorporated herein by this reference.

Color set and histograms as well as elongation and spreadness are described in E. Chang, B. Li, and C. L. Towards Perception-Based Image Retrieval. *IEEE, Content-Based Access of Image and Video Libraries*, pages 101–105, June 2000, which is expressly incorporated herein by this reference.

The computation of color moments is described in Jan Flusser and Tomas Suk, On the Calculation of Image Moments, Research Report No. 1946, January 1999, *Journal of Pattern Recognition Letters*, which is expressly incorporated herein by this reference. Color moments are used to compute elongation and spreadness.

There are multiple resolutions of color features. The presence/absence of each color is at the coarse level of resolution. For instance, coarsest level color evaluation determines whether or not the color red is present in the image. This determination can be made through the evaluation of a color histogram of the entire image. If the color red constitutes less than some prescribed percentage of the overall color in the image, then the color red may be determined to be absent from the image. The average and variance of hue, saturation and intensity (HVS) are at a middle level of color resolution. Thus, for example, if the color red is determined to be present in the image, then a determination is made of the average and variance for each of the red hue, red saturation and red intensity. The color elongation and spreadness are at the finest level of color resolution. Color elongation can be characterized by multiple (7) image moments. Spreadness is a measure of the spatial variance of a color over the image.

There are also multiple levels of resolution for texture features. Referring to the Texture Table, there is an evaluation of the coarse, middle and fine level of feature resolution for each of vertical, diagonal and horizontal textures. In other words, an evaluation is made for each of the thirty-six (36) entries in the Texture Features Table. Thus, for example, referring to the horizontal-coarse (upper left) block in the Texture Features Table, an image is evaluated to determine feature values for an average coarse-horizontal energy feature, a coarse-horizontal energy variance feature, coarse-horizontal elongation feature and a coarse-horizontal spreadness feature. Similarly, for example, referring to the medium-diagonal (center) block in the Texture Features Table, an image is evaluated to determine feature values for an average medium-diagonal energy feature, a medium-diagonal energy variance feature, medium-diagonal elongation feature and a medium-diagonal spreadness feature.

8.1 Multi-Resolution Processing of Color Features

As explained in the above sections, the MEGA query-concept learner process can evaluate samples for refinement through term removal in a multi-resolution fashion. It will be appreciated that multi-resolution refinement is an optimization technique that is not essential to the invention. With respect to colors, multi-resolution evaluation can be described in general terms as follows. With respect to removal of disjunctive terms from the QCS, first, there is an evaluation of differences between positive labeled sample images and the QCS with respect to the eleven cultural colors and the one miscellaneous color. During this first phase, only features relating to the presence/absence of these twelve colors are evaluated. Next, there is an evaluation of the differences between positive labeled sample images and the QCS with respect to hue saturation and intensity (HVS). However, during this second phase, HVS features are evaluated relative to the QCS only for those basic coarse color features, out of the original twelve, that are found to be not different from the QCS. For example, if the red feature of a sample image is found to not match the red feature of the QCS, then in the second phase, there is no evaluation of the HVS for the color red. Finally, there is an evaluation of Elongation and Spreadness. However, during this third phase, Elongation and Spreadness features are evaluated relative to the QCS only for those cultural colors that are found to be not different from the QCS.

The evaluation of conjunctive color terms of the CCS for removal proceeds in an analogous manner with respect to negative-labeled sample images.

8.2 Multi-Resolution Processing of Texture Features

With respect to textures, multi-resolution evaluation can be described in general terms as follows. It will be appreciated that multi-resolution refinement is an optimization technique that is not essential to the invention. With respect to removal of disjunctive terms from the QCS, first, there is an evaluation of differences between positive labeled sample images and the QCS with respect to the coarse-horizontal, coarse-diagonal and coarse-vertical features. It will be noted that each of these three comprises a set of four features. During this first phase, only the twelve coarse texture feature are evaluated. Next, there is an evaluation of the differences between positive labeled sample images and the QCS with respect to the medium texture features, medium-horizontal, medium-diagonal and medium-vertical. However, during this second phase, medium texture features are evaluated relative to the QCS only for those basic coarse texture features that are found to be not different from the QCS. For instance, if a sample image's coarse-horizontal average energy is found to not match the corresponding feature in the QCS, then the medium-horizontal average energy is not evaluated. Finally, there is an evaluation of the differences between positive labeled sample images and the QCS with respect to the fine texture features, fine-horizontal, fine-diagonal and fine-vertical. However, during this third phase, fine texture features are evaluated relative to the QCS only for those medium texture features that are found to be not different from the QCS. For instance, if a sample image's medium-diagonal spreadness is found to not match the corresponding feature in the QCS, then the fine-diagonal spreadness is not evaluated.

The evaluation of conjunctive texture terms of the CCS for removal proceeds in an analogous manner with respect to negative-labeled sample images.

9.0 Relationship Between MEGA and $SVM_{active}$ and SVMDex

To make the query-concept learning even more efficient, a high-dimensional access method can be employed [12] to ensure that eliminating/replacing features incurs minimum additional search overhead. Commonly owned provisional patent application Ser. No. 60/292,820, filed May 22, 2001; and also claims the benefit of the filing date of commonly assigned provisional patent application, Ser. No. 60/281,053, filed Apr. 2, 2001, which is expressly incorporated herein by this reference, discloses such an access method. MEGA can speed up its sampling step by using the support vectors generated by SVMs. The commonly owned provisional patent applications which are expressly incorporated above disclose the use of SVMs. It will be appreciated that $SVM_{active}$ and SVMDex are not part of the MEGA query-concept learner process per se. However, is intended that the novel learner process disclosed in detail herein will be used in conjunction with SVM and SVMDex.

10.0 User Interface Examples

The following provides an illustrative example of the user interface perspective of the novel query-concept learner process.

We present examples in this section to show the learning steps of MEGA and $SVM_{Active}$ in two image query scenarios: image browsing and similarity search.

Note that MEGA, and $SVM_{Active}$ are separate processes. In a proposed system, MEGA and $SVM_{Active}$ will be used together. The invention that is the focus of this patent application pertains to MEGA not $SVM_{Active}$. Thus, $SVM_{Active}$ is not disclosed in detail herein. To learn more about $SVM_{Active}$, refer to the cited papers by Edward Chang.

Image browsing. A user knows what he/she wants but has difficulty articulating it. Through an interActive browsing session, MEGA or $SVM_{Active}$ learns what the user wants.

Similarity search. After MEGA or $SVM_{Active}$ knows what the user wants, the search engine can perform a traditional similarity search to find data objects that appear similar to a given query object.

10.1 MEGA Query Steps

In the following, we present an interActive query session using MEGA. This interActive query session involves seven screens that are illustrated in seven figures. The user's query concept in this example is "wild animals."

Screen 1. [FIG. 3] Initial Screen. Our PBIR system presents the initial screen to the user as depicted in FIG. 3. The screen is split into two frames vertically. On the left-hand side of the screen is the learner frame; on the right-hand side is the similarity search frame. Through the learner frame, PBIR learns what the user wants via an intelligent sampling process. The similarity search frame displays what the system thinks the user wants. (The user can set the number of images to be displayed in these frames.)

Screen 2. [FIG. 4] Sampling and relevance feedback starts. Once the user clicks the "submit" button in the initial frame, the sampling and relevance feedback step commences to learn what the user wants. The PBIR system presents a number of samples in the learner frame, and the user highlights images that are relevant to his/her query concept by clicking on the relevant images.

As shown in FIG. 4, three images (the third image in rows one, two and four in the learner frame) are selected as relevant, and the rest of the unmarked images are considered irrelevant. The user indicates the end of his/her selection by clicking on the submit button in the learner screen. This action brings up the next screen.

Screen 3. [FIG. 5] Sampling and relevance feedback continues. FIG. 5 shows the third screen. At this time, the similarity search frame still does not show any image, since the system has not been able to grasp the user's query concept at this point. The PBIR system again presents samples in the learner frame to solicit feedback. The user selects the second image in the third row as the only image relevant to the query concept.

Screen 4. [FIG. 6] Sampling and relevance feedback continues. FIG. 6 shows the fourth screen. First, the similarity search frame displays what the PBIR system thinks will match the user's query concept at this time. As the figure indicates, the top nine returned images fit the concept of "wild animals." The user's query concept has been captured, though somewhat fuzzily. The user can ask the system to further refine the target concept by selecting relevant images in the learner frame. In this example, the fourth image in the second row and the third image in the fourth row are selected as relevant to the concept. After the user clicks on the submit button in the learner frame, the fifth screen is displayed.

Screen 5. [FIG. 7] Sampling and relevance feedback continues. The similarity search frame in FIG. 7 shows that ten out of the top twelve images returned match the "wild animals" concept. The user selects four relevant images displayed in the learner frame. This leads to the final screen of this learning series.

Screen 6. [FIG. 8] Sampling and relevance feedback ends. FIG. 8 shows that all returned images in the similarity search frames fit the query concept.

Screen 7. [FIG. 9] Similarity search. At any time, the user can click on an image in the similarity search frame to request images that appear similar to the selected image. This step allows the user to zoom in onto a specific set of images that match some appearance criteria, such as color distribution, textures and shapes. As shown in [FIG. 9], after clicking on one of the tiger images, the user will find similar tiger images returned in the similarity search frame. Notice that other wild animals are ranked lower than the matching tiger images, since the user has concentrated more on specific appearances than on general concepts.

In summary, in this example we show that our PBIR system effectively uses MEGA to learn a query concept. The images that match a concept do not have to appear similar in their low-level feature space. The learner is able to match high-level concepts to low-level features directly through an intelligent learning process. Our PBIR system can capture images that match a concept through MEGA, whereas the traditional image systems can do only appearance similarity searches. Again, as illustrated by this example, MEGA can capture the query concept of wild animal (wild animals can be elephants, tigers, bears, and etc), but a traditional similarity search engine can at best select only animals that appear similar.

10.2 $SVM_{Active}$ Sample Results

Finally, FIG. 10 shows two sample results of using $SVM_{Active}$ one from a top-10 flowers query, and one from a top-10 tigers query. The returned images do not necessarily have the same low-level features or appearance. The returned flowers have colors of red, purple, white, and yellow, with or without leaves. The returned tiger images have tigers of different postures on different backgrounds. It will be appreciated that $SVM_{Active}$ does not constitute part of the present invention.

11.0 Experiments

In this section, we report our experimental results. The goals of our experiments were 1: To evaluate whether MEGA can learn k-CNF concepts accurately in the presence of a large number of irrelevant features.

2: To evaluate whether MEGA can converge to a target concept faster than traditional sampling schemes.

3: To evaluate whether MEGA is robust for noisy data or under situations in which the unknown target concept is not expressible in the provided hypothesis space.

We assume all target concepts are in 3-CNF. To conduct our experiments, we used both synthesized data and real-world data.

Synthesized data. We generated three datasets using two different distributions: uniform and Gaussian. Each instance has 10 features between 0 and 1. The values of each feature in a dataset are independently generated. For the Gaussian distribution, we set its mean to 0.5 and its standard deviation to ⅙. Each dataset has 10,000 vectors.

Real-world data. We conducted experiments on a 1,500-image dataset collected from Corel image CDs and the Internet. The images in the dataset belong to 10 categories—architecture, bears, clouds, flowers, landscape, people, objectionable images, tigers, tools, and waves. Each image is characterized by a 144 dimensions feature vector (described in Section 11.3).

We used precision and recall to measure performance. We tallied precision/recall for up to only 10 iterations, since we deemed it unrealistic to expect an interactive user to conduct more than 10 rounds of relevance feedback. We compared MEGA with the five sampling schemes: random, bounded random, nearest neighbor, query expansion, and aggressive. We used these sampling schemes for comparison because they are employed by some state-of-the-art systems described in Section 12.

FIG. 11 shows how some of these sampling algorithms work. The main features of the sampling schemes are given below.

Random: Samples are randomly selected from the bulk of the domain (FIG. 11(a)).

Bounded Random: Samples are randomly selected from between QCS and CCS (FIG. 11(b)).

Nearest Neighbor. Samples are selected from the nearest neighborhood of the center of the positive-labeled instances.

Query Expansion: Samples are selected from the neighborhood of multiple positive-labeled instances.

Aggressive: Samples are selected from the unlabeled ones that satisfy the most general concepts in CCS (FIG. 11(c)).

MEGA: Samples are selected between QCS and CCS to eliminate the maximum expected number of terms (FIG. 11(d)).

We ran experiments on datasets of different distributions and repeated each experiment 10 times. The experimental results are presented in two groups. We first show the results of the experiments on the synthesized datasets. We then show the results on a 1,500-image dataset.

11.1 Query Concept Learning Applied to Synthesized Datasets

We tested many target concepts on the two synthesized datasets. Due to space limitations, we present only three representative test cases, those that represent a disjunctive concept, a conjunctive of disjunctions, and a complex concept with more terms. The three tests are 1: $P_1 \vee P_2$, 2: $(P_1 \vee P_2) \wedge P_3$, 3: $P_1 \wedge (P_2 \vee P_3) \wedge (P_4 \vee P_5 \vee P_6) \wedge (P_2 \vee P_4 \vee P_7)$, We first assume that the dataset is free of user errors and set the sample size $K_a$ to 20. In the remainder of this section, we report our initial results, and then we report the effects of model bias and user errors on MEGA (Sections 11.2.1 and 11.2.2).

11.1.1 Experimental Results

FIG. 12 presents the precision/recall after three user iterations of the six sampling schemes learning the two concepts, $(P_1 \vee P_2) \wedge P_3$ and $P_1 \wedge (P_2 \vee P_3) \wedge (P_4 \vee P_5 \vee P_6) \wedge (P_2 \vee P_4 \vee P_7)$. The performance trend of the six schemes is similar at different numbers of iterations. We deem three iterations a critical juncture where a user would be likely to lose his/her patience, and thus we first present the results at the end of the third iteration. The performance curve of MEGA far exceeds that of the other five schemes at all recall levels. Note that for learning both concepts, MEGA achieves 100% precision at all recall levels.

Next, we were interested in learning the improvement on search accuracy with respect to the number of user iterations. This improvement trend can tell us how fast a scheme can learn a target concept. We present a set of tables and charts where we fix recall at 0.5 and examine the improvement in precision with respect to the number of iterations.

times the standard deviation, we may not find enough positive examples in the unlabeled pool to eliminate all superfluous disjunctions. Since this situation is rare, the negative effect on the average precision/recall is insignificant. The performance gaps between the six sampling schemes were similar when we applied them to the two

TABLE 7

Learning $P_1 \vee P_2$ Applied to A Uniform Dataset.

| Rnd # | Random | B-Random | N-Neighbor | Q-Expansion | Aggressive | Algorithm MEGA |
|---|---|---|---|---|---|---|
| 1 | 0.23715 | 0.23715 | 0.20319 | 0.20319 | 0.23715 | 0.23715 |
| 2 | 0.44421 | 0.44421 | 0.48207 | 0.44422 | 0.44421 | 0.30098 |
| 3 | 0.49507 | 0.50389 | 0.41036 | 0.45219 | 0.50389 | 1.00000 |
| 4 | 0.50389 | 1.00000 | 0.36753 | 0.51394 | 1.00000 | 1.00000 |
| 5 | 1.00000 | 1.00000 | 0.35857 | 0.78088 | 1.00000 | 1.00000 |
| 6 | 1.00000 | 1.00000 | 0.33865 | 0.88247 | 1.00000 | 1.00000 |
| 7 | 1.00000 | 1.00000 | 0.32669 | 0.93028 | 1.00000 | 1.00000 |
| 8 | 1.00000 | 1.00000 | 0.32271 | 0.93028 | 1.00000 | 1.00000 |
| 9 | 1.00000 | 1.00000 | 0.29880 | 0.93028 | 1.00000 | 1.00000 |
| 10 | 1.00000 | 1.00000 | 0.32570 | 0.93028 | 1.00000 | 1.00000 |

Tables 7 and 8 present the precision of six sampling schemes in learning $P_1 \vee P_2$ in 10 rounds of relevance feedback. These tables show that MEGA consistently converges to the target concept in the smallest number of iterations. Applied to the Gaussian dataset, MEGA converges after four iterations. The random sampling scheme requires on average two more iterations to converge. The performance of the bounded random scheme and the performance of the aggressive scheme fall between that of the random scheme and that of MEGA. On the aggressive scheme, which attempts to remove as many terms as possible, the chosen samples are less likely to be labeled positive and hence make less of a contribution to the progress of learning the QCS. We will show shortly that the gaps in performance between MEGA and the other schemes increase as the target concept becomes more complex.

datasets; therefore, we report only the results of the experiments on the uniform dataset in the remainder of this section.

FIG. 13 depicts the results of the second and third tests on the uniform dataset. The figure shows that MEGA outperforms the other scheme (in precision at a fixed recall) by much wider margins. It takes MEGA only three iterations to learn these concepts, whereas the other schemes progress more slowly. Schemes like nearest-neighbor and query expansion fail miserably because they suffer from severe model bias. Furthermore, they cannot eliminate irrelevant features quickly.

11.2 Addition Results

We also performed tests on a 20 and 30 feature dataset. The results are shown in FIGS. 14 and 15. The higher the dimension, the wider the performance gap between MEGA

TABLE 8

Learning $P_1 \vee P_2$ Applied to Gaussian Dataset.

| Rnd # | Random | B-Random | N-Neighbor | Q-Expansion | Aggressive | Algorithm MEGA |
|---|---|---|---|---|---|---|
| 1 | 0.08236 | 0.08236 | 0.22970 | 0.22970 | 0.08236 | 0.08236 |
| 2 | 0.22178 | 0.22178 | 0.65722 | 0.46684 | 0.36241 | 0.32438 |
| 3 | 0.37332 | 0.37332 | 0.64907 | 0.47027 | 0.80584 | 0.65982 |
| 4 | 0.38200 | 0.51249 | 0.64134 | 0.46598 | 0.80584 | 1.00000 |
| 5 | 0.51249 | 1.00000 | 0.63941 | 0.66237 | 0.80584 | 1.00000 |
| 6 | 1.00000 | 1.00000 | 0.62782 | 0.46491 | 0.80584 | 1.00000 |
| 7 | 1.00000 | 1.00000 | 0.61000 | 0.47135 | 0.80584 | 1.00000 |
| 8 | 1.00000 | 1.00000 | 0.61000 | 0.61258 | 0.80584 | 1.00000 |
| 9 | 1.00000 | 1.00000 | 0.61000 | 0.48830 | 0.80584 | 1.00000 |
| 10 | 1.00000 | 1.00000 | 0.61000 | 0.64198 | 0.80584 | 1.00000 |

The results of all datasets and all subsequent tests show that both the nearest neighbor and the query expansion schemes converge very slowly. The result is consistent with that reported in [16, 18], which shows that the query expansion approach does better than the nearest neighbor approach but both suffer from slow convergence. Sampling in the nearest neighborhood tends to result in low precision/recall if the initial query samples are not perfect.

The precision at a given recall achieved by the experiments applied to the Gaussian dataset is lower than that of the experiments applied to the uniform dataset. This is because when an initial query point falls outside of, say, two and the rest of the schemes. This is because MEGA can eliminate irrelevant features much faster than the other schemes.

11.2.1 Model Bias Test

We have shown that MEGA outperforms the other five sampling schemes significantly when the target query concept is in k-CNF. We now present test cases that favor a convex concept, which can be expressed as a linear weighted sum of features to examine how MEGA performs. The target concept we tested is in the form of $\alpha P_1 + (1-\alpha)P_2$, where the value of $\alpha$ is between zero and one.

In this set of tests, we compare MEGA with the nearest neighbor scheme and the query expansion scheme, which are the representative schemes designed for refining convex concepts. We started by picking 20 random images to see how fast each scheme would converge to the target concepts. Again, we repeated each experiment 100 times and recorded each scheme's average precision and recall.

We tested six convex concepts by setting $\alpha=0, 0.1, \ldots, 0.5$. Below, we report the precision/recall of the three learning methods on two concepts: $0.3P_1+0.7P_2$ ($\alpha=0.3$) and $0.5P_1+0.5P_2$ ($\alpha=0.5$). Setting $\alpha$ in this range makes MEGA suffer from model bias. (We still discuss the reasons shortly.) FIG. 16 presents the precision/recall of the three schemes for learning these two concepts after three user iterations. Surprisingly, even though MEGA is not modeled after a convex concept, the performance curve of MEGA far exceeds that of the other two schemes in learning both concepts.

To understand the reasons why MEGA works better than the nearest neighbor and query expansion schemes and how each scheme improves from one iteration to another, we present a set of charts where we fix recall at 0.5 and examine the trend of precision with respect to the number of iterations. (The trend at other recall levels is similar.) FIG. 17($a$) shows the result of learning concept $P_2$ (setting $\alpha=0$). MEGA does very well in this experiment, since it suffers no model bias. Neither the nearest neighbor nor the query expansion scheme does as well because they are slow in eliminating terms.

What if a user does have a weighted linear query concept? Even so, MEGA can approximate this model fairly well. FIGS. 17($b$), ($c$), ($d$), ($e$), and ($f$) all show that MEGA achieves higher precision faster than either the nearest neighbor or the query expansion scheme under all $\alpha$ settings. We summarize our observations as follows:

1. When $\alpha=0$ (or 1), the concept has only one predicate and MEGA has better precision by a wide margin than these traditional schemes, since it can converge much faster. Even when $\alpha$ is near 0 or 1, the precision of MEGA decreases slightly but still outperforms the traditional schemes, as shown in FIG. 17($b$). This is because although MEGA suffers slightly from model bias, its fast convergence makes it a better choice when the number of iterations is relatively small.

2. When $\alpha=0.5$, MEGA can approximate the convex concept by $P_1 \wedge P_2$. FIGS. 17($e$) and ($f$) show that when $\alpha$ is near 0.5, MEGA trails the query expansion by only a slim margin after five/six user iterations. Although the query expansion scheme eventually converges to the target concept, MEGA's fast improvement in precision in just a couple of iterations makes it more attractive, even though slower learning schemes might eventually achieve a slightly higher precision.

3. FIGS. 17($c$) through ($e$) show that when $\alpha$ is between 0.2 and 0.4, MEGA suffers from model bias and its achievable precision can be low. However, our primary concern is with the range between three and five iterations that will probably reflect the patience of on-line users. For this purpose, MEGA is more attractive even with its model bias. When $\alpha=0.2$, MEGA reaches 70% precision after two iterations whereas the query expansion scheme requires seven iterations to reach the same precision.

11.2.2 User Error Test

In this experiment, we learned the $(P_1 \vee P_2) \wedge (P_3 \vee P_4)$ concept under three different error rates, 5%, 10%, and 15%. (A five percent error rate means that one out of 20 samples is mislabeled.)

We also used two different $\gamma$ settings (one and two) to examine the trade off between learning speed and accuracy. FIG. 18 presents the precision/recall after two or three user iterations under different error rates. MEGA enjoys little to no performance degradation when the noise rates are less than or equal to 10%. When the error rate is 15%, MEGA's search accuracy starts to deteriorate. This experiment shows that MEGA is able to tolerate mild user errors.

Next, we fix recall at 50% and examine how different error rates and $\gamma$ settings affect learning precision. FIG. 19($a$) shows that under both $\gamma=1$ and $\gamma=2$ settings, MEGA reaches high precision. However, MEGA's precision improves much faster when $\gamma=1$ than when $\gamma=2$. This result does not surprise us, since a lower $\gamma$ value eliminates terms more aggressively and hence leads to faster convergence. When the noise level is high (15%), FIG. 19($b$) shows that a low $\gamma$ setting hinders accurate learning of the target concept. This is because MEGA eliminates terms too aggressively, and the high noise level causes it to eliminate wrong terms. But if we set $\gamma=2$, we can learn the concept with higher accuracy by slowing down the learning pace. This experiment shows a clear trade off between learning accuracy and convergence speed. When the noise level is low, it is preferable to use a less strict voting scheme (i.e., setting a smaller $\gamma$) for achieving faster convergence. When the noise level is high, a stricter voting scheme (i.e., using a larger $\gamma$) will better maintain high accuracy.

11.2.3 Observations

We can summarize the above experimental results as follows:

1. Convergence speed: MEGA converges much faster than the other schemes in all cases.

2. Model accuracy: MEGA outperforms the other schemes by a wide margin when the target query concept is in k-CNF. Even when a user's query concept is a weighted linear function, MEGA can approximate it fairly well. The fact that MEGA can achieve a high convergence ratio in a small number of iterations makes it an attractive on-line learning scheme.

3. Noise tolerance: MEGA does well under noisy conditions, including model bias and user errors.

11.3 MEGA Applied to An Image Dataset

We also conducted experiments on a 1,500-image dataset [1]. A 144-dimension feature vector was extracted for each image containing information about color histograms, color moments, textures, etc. [2]. We divided features into nine sets based on their resolutions (depicted in Table 9). We assumed that query concepts could be modeled in 3-CNF. Each of the query concepts we tested belongs to one of the 10 image categories: architecture, bears, clouds, flowers, landscape, and people, objectionable images, tigers, tools, and waves. MEGA learned a target concept solely in the feature space and had no knowledge about these categories.

In each experiment, we began with a set of 20 randomly generated images for querying user feedback. After each iteration, we evaluated the performance by retrieving top-K images based on the concept we had learned. We recorded the ratio of these images that satisfied the user's concept. We ran each experiment through up to five rounds of relevance feedback, since we deemed it unrealistic to expect an interactive user to conduct too many rounds of feedback. We ran each experiment 10 times with different initial starting samples.

Table 10 shows the precision of the 10 query concepts-for K=10 or 20. (Recall is not presented in this case because it is irrelevant.) For each of the queries, after three iterations, the results were satisfactory concerning the quality of the top-10 retrieval. For top-20 retrieval, it required only one more iteration to surpass 86% precision. Finally, FIG. 20 shows the average precision of the top-10 and top-20 retrieval of all queries with respect to the number of iterations.

TABLE 9

Multi-resolution Image Features.

| Feature Group # | Filter Name | Resolution | Representation |
|---|---|---|---|
| 1 | Color Masks | Coarse | Number of identical culture colors |
| 2 | Color Histograms | Medium | Distribution of colors |
| 3 | Color Average | Medium | Similiarity comparison within the same culture color |
| 4 | Color Variance | Fine | Similiarity comparison within the same culture color |
| 5 | Spread | Coarse | Spatial concentration of a color |
| 6 | Elongation | Coarse | Shape of a color |
| 7 | Vertical Wavelets Level 1 | Coarse | Vertical frequency components |
|   | Horizontal Wavelets Level 1 |   | Horizontal frequency components |
|   | Diagonal Wavelets Level 1 |   | Diagonal frequency components |
| 8 | Vertical Wavelets Level 2 | Medium | Vertical frequency components |
|   | Horizontal Wavelets Level 2 |   | Horizontal frequency components |
|   | Diagonal Wavelets Level 2 |   | Diagonal frequency components |
| 9 | Vertical Wavelets Level 3 | Fine | Vertical frequency components |
|   | Horizontal Wavelets Level 3 |   | Horizontal frequency components |
|   | Diagonal Wavelets Level 3 |   | Diagonal frequency components |

12.0 Related Work

The existing work in query-concept learning suffers in at least one of the following three areas: sample selection, feature reduction, and query-concept modeling.

In most inductive learning problems studied in the AI community, samples are assumed to be taken randomly in such a way that various statistical properties can be derived conveniently. However, for interactive applications where the number of samples must be small (or impatient users might be turned away), random sampling is not suitable.

Relevance feedback techniques proposed by the IR (Information Retrieval) and database communities do perform non-random sampling. The study of [16] puts these query refinement approaches into three categories: query reweighting, query point movement, and query expansion.

Query reweighting and query point movement [7, 14, 15]. Both query reweighting and query point movement use nearest-neighbor sampling: They return top ranked objects to be marked by the user and refine the query based on the feedback. If the initial query example is good, this nearest-neighbor sampling approach works fine. However, most users may not have a good example to start a query. Refining around bad examples is analogous to trying to find oranges in the middle of an apple orchard by refining one's search to a few rows of apple trees at a time. It will take a long time to find oranges (the desired result). In addition, theoretical studies show that for the nearest neighbor approach, the number of samples needed to reach a given accuracy grows exponentially with the number of irrelevant features [10, 11], even for conjunctive concepts.

Query expansion [16, 201]. The query expansion approach can be regarded as a multiple-instances sampling approach. The samples of the next round are selected from the neighborhood (not necessarily the nearest ones) of the positive-labeled instances of the previous round. The study of [16] shows that query expansion achieves only a slim margin of improvement (about 10% in precision/recall) over query point movement. Again, the presence of irrelevant features can make this approach perform poorly.

To reduce learning samples, active learning or pool-based learning has been introduced for choosing good samples from the unlabeled data pool. The Query by Committee (QBC) algorithm [6], uses a distribution over the hypothesis space (i.e., a distribution over all possible classifiers) and then chooses a sample to query an oracle (a user) to reduce entropy of the posterior distribution over the hypothesis space by the largest amount. QBC reduces the number of samples needed for learning a classifier, but it does not tackle the irrelevant feature problem. MEGA may be regarded as a variant of the QBC algorithm with an additional embedded feature reduction step. MEGA provides an effective method for refining committee members (i.e., a k-CNF and a k-DNF hypothesis), and at the same time, delimits the boundary of the sampling space for efficiently

TABLE 10

Experimental Results on Image Dataset.

| | Iteration 1 | | Iteration 2 | | Iteration 3 | | Iteration 4 | | Iteration 5 | |
|---|---|---|---|---|---|---|---|---|---|---|
| Categories | Top 10 | Top 20 | Top 10 | Top 20 | Top 10 | Top 20 | Top 10 | Top 20 | Top 10 | Top 20 |
| Architecture | 0.800 | 0.710 | 0.950 | 0.865 | 1.000 | 0.950 | 1.000 | 0.970 | 0.910 | 0.920 |
| Bears | 0.030 | 0.065 | 0.380 | 0.220 | 0.760 | 0.490 | 0.860 | 0.740 | 0.910 | 0.690 |
| Clouds | 0.260 | 0.180 | 0.420 | 0.295 | 0.780 | 0.580 | 0.910 | 0.720 | 0.980 | 0.895 |
| Flowers | 0.670 | 0.445 | 0.750 | 0.715 | 0.990 | 0.855 | 1.000 | 0.950 | 1.000 | 0.950 |
| Landscape | 0.370 | 0.260 | 0.580 | 0.430 | 0.850 | 0.575 | 0.950 | 0.795 | 0.880 | 0.900 |
| Objectionable | 0.760 | 0.670 | 0.890 | 0.815 | 1.000 | 0.900 | 0.990 | 0.955 | 0.970 | 0.950 |
| People | 0.340 | 0.250 | 0.660 | 0.550 | 0.810 | 0.635 | 1.000 | 0.815 | 0.990 | 0.840 |
| Tigers | 0.440 | 0.375 | 0.580 | 0.410 | 1.000 | 0.880 | 1.000 | 0.930 | 1.000 | 0.980 |
| Tools | 0.420 | 0.350 | 1.000 | 0.980 | 1.000 | 1.000 | 1.000 | 1.000 | 1.000 | 1.000 |
| Waves | 0.480 | 0.425 | 0.960 | 0.585 | 0.810 | 0.730 | 0.930 | 0.800 | 0.990 | 0.845 |
| Average | 0.457 | 0.373 | 0.717 | 0.587 | 0.900 | 0.760 | 0.964 | 0.868 | 0.963 | 0.897 | finding useful samples to further refine the committee members and the sampling boundary.

For image retrieval, the PicHunter system [3] uses Bayesian prediction to infer the goal image, based upon users' input. Mathematically, the goal of PicHunter is to find a single goal point in the feature space (e.g., a particular flower image), whereas our goal is to hunt down all points that match a query concept (e.g., the entire flower category, which consists of flowers of different colors, shapes, and textures, and against different backgrounds). Note that the points matching a target concept can be scattered all over the feature space. To find these points quickly with few hints, our project must deal with many daunting challenges.

Finally, much traditional work suffers from model bias. Some systems (e.g., [4, 5]) assume that the overall similarity can be expressed as a weighted linear combination of similarities in features. Similarly, some systems assume that query concepts are disjunctive [20]. When a query concept does not fit the model assumption, these systems perform poorly. MEGA works well with model bias and moderately noisy feedback.

While particular embodiments of the invention have been disclosed in detail, various modifications to the preferred embodiments can be made without departing from the spirit and scope of the invention. For example, an objective of an alternative embodiment of a MEGA learning process might be to find at least one relevant (positive labeled) sample object. In that case, one approach to speeding up the learning process would be to shrink the CCS as fast as possible without regard to a QCS. Such an approach could involve identifying those terms of a sample objects indicated as not close to the user query concept that do not differ form a k-DNF by at least a prescribed amount, as measured by a $k_d$ value and an γ value, for example. Thus, the invention is limited only by the appended claims.

What is claimed is:

1. A method of learning user query concept for searching objects encoded in computer readable storage media comprising:

providing a multiplicity of respective sample objects encoded in a computer readable medium;

providing a multiplicity of respective sample expressions encoded in computer readable medium that respectively correspond to respective sample objects and in which respective predicates of such respective sample expressions represent respective features of corresponding sample objects;

defining a user query concept sample space bounded by a boundary k-CNF expression which designates a more specific concept within the user query concept sample space and by a boundary k-DNF expression which designates a more general concept within the user query concept sample space;

refining the user query concept sample space by, selecting multiple sample objects from within the user query concept sample space;

presenting the multiple selected sample objects to the user;

soliciting user feedback as to closeness of individual ones of the multiple presented sample objects to the user's query concept;

wherein refining the user query concept sample space further includes refining the boundary k-CNF expression by identifying respective predicates of respective sample expressions that are different from corresponding respective predicates of the boundary k-CNF expression for those respective sample expressions corresponding to respective sample objects indicated by the user as close to the user's query concept;

determining which, if any, respective predicates of the boundary k-CNF expression identified as different from corresponding respective predicates of sample expressions indicated by the user as close to the user's query concept to remove from the boundary k-CNF expression;

removing from the boundary k-CNF expression respective predicates determined to be removed;

wherein refining the user query concept sample space further includes, refining the boundary k-DNF expression by, identifying respective predicates of respective sample expressions that are not different from corresponding respective predicates of the boundary k-DNF expression for those respective sample expressions corresponding to respective sample objects indicated by the user as not close to the user's query concept;

determining which, if any, respective predicates of the boundary k-DNF expression-identified as not different from corresponding respective predicates of sample expressions indicated by the user as not close to the user's query concept to remove from the boundary k-DNF expression; and removing from the boundary k-DNF expression respective predicates determined to be removed.

2. The method of claim 1 further including:

removing respective sample objects presented to the user from eligibility for presentation to the same user.

3. The method of claim 1 further including:

repeating the steps involved in refining the user query concept sample space.

4. The method of claim 1 further including:

repeating the steps involved in refining the user query concept sample space until the boundary k-DNF expression becomes identical to or more specific than the boundary k-CNF expression.

5. The method of claim 1 further including:

repeating the steps involved in refining the user query concept sample space until the user ends search.

6. The method of claim 1 further including:

dividing the boundary k-CNF into multiple sub-group k-CNF expressions by separating respective predicates that can express each other's feature information into different sub-group k-CNF expressions such that such separation of predicates does not result in loss of combinations of feature information due to such dividing;

wherein identifying respective predicates of respective sample expressions that are different from corresponding respective predicates of the boundary k-CNF expression involved identifying respective predicates of respective sample expressions that are different from corresponding respective predicates of respective sub-group k-CNF expressions; and wherein determining which, if any, respective predicates of the boundary k-CNF to remove from the boundary k-CNF expression involves determining which respective predicates of the respective sub-group k-CNF expressions identified as contradictory to corresponding respective predicates of sample expressions to remove.

7. The method of claim 1 further including:

dividing the boundary k-CNF into multiple sub-group k-CNF expressions by separating respective predicates that can express each other's feature information into different sub-group k-CNF expressions such that such separation of predicates does not result in loss of combinations of feature information due to such dividing;

wherein identifying respective predicates of respective sample expressions that are different from corresponding respective predicates of the boundary k-CNF expression involves identifying respective predicates of respective sample expressions that are different from corresponding respective predicates of respective sub-group k-CNF expressions; and wherein determining which, if any, respective predicates of the boundary k-CNF to remove from the boundary k-CNF expression involves determining which respective predicates of the respective sub-group k-CNF expressions identified as different from corresponding respective predicates of sample expressions to remove; and dividing the boundary k-CNF expression into multiple sub-group k-DNF expressions by separating respective predicates that can express each other's feature information into different sub-group k-DNF expressions such that such separation of predicates does not result in loss of combinations of feature information due to such dividing;

wherein identifying respective predicates of respective sample expressions that are not different from corresponding respective predicates of the boundary k-DNF expression involves identifying respective predicates of respective sample expressions that are not different from corresponding respective predicates of respective sub-group k-DNF expressions; and wherein determining which, if any, respective predicates of the boundary k-DNF to remove from the boundary k-DNF expression involves determining which respective predicates of the respective sub-group k-DNF expressions identified as not different from corresponding respective predicates of sample expressions to remove.

8. The method of claim 1, wherein identifying respective predicates of respective sample expressions that are different from corresponding respective predicates of the boundary k-CNF expression includes, testing respective sample expression predicates for differences from corresponding respective predicates of the boundary k-CNF expression in a prescribed order such that, for a respective given feature, a respective predicate representing higher resolution of such given respective feature is tested before a respective predicate representing a lower resolution of such given respective feature; and not testing such respective predicate representing the lower resolution of such given respective feature if testing of the respective predicate representing a higher resolution of such given respective feature indicates that there is a prescribed difference between the higher resolution sample expression predicate for such given respective feature and a corresponding respective higher resolution predicate of the boundary k-CNF expression.

9. The method of claim 1, wherein identifying respective predicates of respective sample expressions that contradict corresponding respective predicates of the boundary k-CNF expression includes, testing respective sample expression predicates for differences from corresponding respective predicates of the boundary k-CNF expression in a prescribed order such that, for a respective given feature, a respective predicate representing higher resolution of such given respective feature is tested before a respective predicate representing a lower resolution of such given respective feature; and not testing such respective predicate representing the lower resolution of such given respective feature if testing of a respective predicate representing a higher resolution of such given respective feature indicates that there is a prescribed difference between the higher resolution sample expression predicate for such given respective feature and a corresponding higher resolution predicate of the boundary k-CNF expression; and wherein identifying respective predicates of respective sample expressions that do not contradict corresponding respective predicates of the boundary k-DNF expression includes, testing respective sample expression predicates for differences from corresponding respective predicates of the boundary k-DNF expression in a prescribed order such that, for a respective given feature, a respective predicate representing higher resolution of such given respective feature is tested before a respective predicate representing a lower resolution of such given respective feature; and not testing such respective predicate representing the lower resolution of such given respective feature if the testing of the respective predicate representing the higher resolution of such given respective feature indicates that there is a not a prescribed difference between the higher resolution sample expression predicate for such given respective feature and a corresponding respective higher resolution predicate of the boundary k-DNF expression.

10. The method of claim 1, wherein determining which, if any, respective predicates of the boundary k-CNF expression to remove includes, determining which respective predicates of the boundary k-CNF expression are different by at least a prescribed amount from corresponding respective predicates of more than a prescribed number of sample expressions.

11. The method of claim 1, wherein determining which, if any, respective predicates of the boundary k-CNF expression to remove includes, determining which respective predicates of the boundary k-CNF expression are different by at least a prescribed amount from corresponding respective predicates of more than a prescribed number of sample expressions;

wherein determining which, if any, respective predicates of the boundary k-DNF expression to remove includes, determining which respective predicates of the boundary k-DNF expression are not different by a least a prescribed amount from corresponding respective predicates of more than a prescribed number of sample expressions.

12. The method of claim 1, wherein selecting multiple sample objects from within the user query concept sample space includes, selecting respective sample objects that correspond to respective sample expressions that have a prescribed number of respective predicates that contradict corresponding respective predicates of the boundary k-CNF expression.

13. The method of claim 1, wherein selecting multiple sample objects from within the user query concept sample space includes, selecting respective sample objects that correspond to respective sample expressions that have a prescribed number of respective predicates that are different from corresponding respective predicates of the boundary k-CNF expression;

wherein the prescribed number is chosen by balancing a need for a prescribed number that is small enough that a selected sample object is likely to be indicated by the user as being close to the user's query concept with a need for a prescribed number that is large enough that a selected sample object indicated by the user to be close to the user's query concept is likely to correspond to a sample expression including a predicate that is different from a corresponding predicate of the boundary k-CNF.

14. The method of claim 1, wherein selecting multiple sample objects from the user query concept sample space includes, selecting respective sample objects that correspond to respective sample expressions for which ψ predicates in respective corresponding sample expressions are different from the boundary k-CNF expression;

wherein, $$\psi = 1/\ln(1/1-p), \text{ and}$$

wherein p represents a probability that a given predicate of the boundary k-CNF expression will be removed from the k-CNF expression in the step of removing from the boundary k-CNF expression respective predicates determined to be removed.

15. The method of claim 1, wherein selecting multiple sample objects from the user query concept sample space includes, selecting respective sample objects that correspond to respective sample expressions that have a prescribed number of respective predicates that are different from corresponding respective predicates of the boundary k-CNF expression;

wherein the prescribed number is determined empirically by balancing a need for a prescribed number that is small enough that a selected sample object is likely to be indicated by the user as being close to the user's query concept with a need for a prescribed number that is large enough that a selected sample object indicated by the user to be close to the user's query concept is likely to correspond to a sample expression including a predicate different from a corresponding predicate of the k-CNF.

16. The method of claim 1, wherein defining the user query concept sample space includes, selecting an initial set of sample objects by choosing at least one sample object from each of multiple pre-clustered sets of sample objects.

17. The method of claim 1, wherein selecting multiple sample objects from within the user query concept sample space includes, respectively selecting objects that correspond to respective sample expressions that have a prescribed number of respective predicates that are different from corresponding respective predicates of the boundary k-CNF expression;

wherein determining which, if any, respective predicates of the boundary k-CNF expression to remove includes, determining which respective predicates of the boundary k-CNF expression are different from corresponding respective predicates of more than a prescribed number of sample expressions; and wherein removing from the boundary k-CNF expression respective predicates determined to be removed includes, removing from the boundary k-CNF expression respective predicates that are different from corresponding respective predicates of more than the prescribed number of sample expressions.

18. The method of claim 1, wherein selecting multiple sample objects from within the user query concept sample space includes, respectively selecting objects that correspond to respective sample expressions that have a prescribed number of respective predicates that are different from corresponding respective predicates of the boundary k-CNF expression;

wherein determining which, if any, respective predicates of the boundary k-CNF expression to remove includes, determining which respective predicates of the boundary k-CNF expression are different from corresponding respective predicates of more than a prescribed number of sample expressions;

wherein removing from the boundary k-CNF expression respective predicates determined to be removed includes, removing from the boundary k-CNF expression respective predicates that are different from corresponding respective predicates of more than the prescribed number of sample expressions; and wherein determining which, if any, respective predicates of the boundary k-DNF expression to remove includes, determining which respective predicates of the boundary k-DNF expression are not different from corresponding respective predicates of more than a prescribed number of sample expressions;

wherein removing from the boundary k-DNF expression respective predicates determined to be removed includes, removing from the boundary k-DNF expression respective predicates that are not different from corresponding respective predicates of more than the prescribed number of sample expressions.

19. A method of learning user query concept for searching objects encoded in computer readable storage media comprising:

providing a multiplicity of respective sample objects encoded in a computer readable medium;

providing a multiplicity of respective sample expressions encoded in computer readable medium that respectively correspond to respective sample objects and in which respective predicates of such respective sample expressions represent respective features of corresponding sample objects;

defining a user query concept sample space by initially designating an initial set of sample objects with at least one sample object from each of multiple pre-clustered sets of sample objects as an initial user query concept sample space and by defining a boundary k-CNF expression and a boundary k-DNF expression which, together, encompass an initial set of sample expressions that correspond respectively to the sample objects of the initial set of sample objects; wherein the boundary k-CNF expression designates a more specific concept within the user query concept sample space; and wherein the boundary k-DNF expression designates a more general concept within the user query concept sample space;

refining the user query concept sample space by, selecting multiple sample objects from within the user query concept sample space that correspond to respective sample expressions that have a prescribed number of respective predicates that are different from corresponding respective predicates of the boundary k-CNF expression;

presenting the multiple selected sample objects to the user;

soliciting user feedback as to which of the multiple presented sample objects are close to the user's query concept;

wherein refining the user query concept sample space further includes, refining the boundary k-CNF expression by, identifying respective predicates of respective sample expressions that are different from corresponding respective predicates of the boundary k-CNF expression for those respective sample expressions corresponding to respective sample objects indicated by the user as close to the user's query concept;

determining which, if any, respective predicates of the boundary k-CNF expression identified as different from corresponding respective predicates of sample expressions indicated by the user as close to the user's query concept are different from corresponding respective predicates of more than a prescribed number of sample expressions;

removing from the boundary k-CNF expression respective predicates that are different from corresponding respective predicates of more than the prescribed number of sample expressions;

wherein refining the user query concept sample space further includes, refining the boundary k-DNF expression by, identifying respective predicates of respective sample expressions that are not different from corresponding respective predicates of the boundary k-DNF expression for those respective sample expressions corresponding to respective sample objects indicated by the user as not close to the user's query concept;

determining which, if any, respective predicates of the boundary k-DNF expression identified as not different from corresponding respective predicates of sample expressions indicated by the user as not close to the user's query concept to remove from the boundary k-DNF expression;

removing from the boundary k-DNF expression respective predicates determined to be removed; and repeating the steps involved in refining the user query concept sample space until the user ends the search.

20. The method of claim 19, wherein determining which, if any, respective predicates of the boundary k-DNF expression to remove includes, determining which respective predicates of the boundary k-DNF expression are not different from corresponding respective predicates of more than a prescribed number of sample expressions;

wherein removing from the boundary k-DNF expression respective predicates determined to be removed includes, removing from the boundary k-DNF expression respective predicates that are not different from corresponding respective predicates of more than the prescribed number of sample expressions.

21. A method of learning user query concept for searching objects encoded in computer readable storage media comprising:

providing a multiplicity of respective sample objects encoded in a computer readable medium;

providing a multiplicity of respective sample expressions encoded in computer readable medium that respectively correspond to respective sample objects and in which respective predicates of such respective sample expressions represent respective features of corresponding sample objects;

defining a user query concept sample space bounded by a boundary k-DNF expression;

refining the user query concept sample space by, selecting multiple sample objects from within the user query concept sample space;

presenting the multiple selected sample objects to the user;

soliciting user feedback as to closeness of individual ones of the multiple presented sample objects to the user's query concept;

identifying respective predicates of respective sample expressions that are not different from corresponding respective predicates of the boundary k-DNF expression for those respective sample expressions corresponding to respective sample objects indicated by the user as not close to the user's query concept;

determining which, if any, respective predicates of the boundary k-DNF expression identified as not different corresponding respective predicates of sample expressions indicated by the user as not close to the user's query concept to remove from the boundary k-DNF expression;

removing from the boundary k-DNF expression respective predicates determined to be removed; and repeating the steps involved in refining at least until the user identifies a sample object as being close to the user's query concept.

22. A method of learning user query concept for searching objects encoded in computer readable storage media comprising:

providing a multiplicity of respective sample objects encoded in a computer readable medium;

providing a multiplicity of respective sample expressions encoded in computer readable medium that respectively correspond to respective sample objects and in which respective predicates of such respective sample expressions represent respective features of corresponding sample objects;

defining a user query concept sample space bounded by a boundary k-CNF expression which designates a more specific concept within the user query concept sample space and by a boundary k-DNF expression which designates a more general concept within the user query concept sample space;

refining a user query concept sample space by, selecting multiple sample objects from within the user query concept sample space;

presenting the multiple selected sample objects to the user;

soliciting user feedback as to closeness of individual ones of the multiple presented sample objects to the user's query concept;

wherein refining the user query concept sample space further includes refining the boundary k-CNF expression by identifying respective predicates of respective sample expressions that are different from corresponding respective predicates of the boundary k-CNF expression for those respective sample expressions corresponding to respective sample objects indicated by the user as close to the user's query concept;

removing from the boundary k-CNF expression respective identified predicates;

wherein refining the user query concept sample space further includes, refining the boundary k-DNF expression by, identifying respective predicates of respective sample expressions that are not different from corresponding respective predicates of the boundary k-DNF expression for those respective sample expressions corresponding to respective sample objects indicated by the user as not close to the user's query concept; and removing from the boundary k-DNF expression respective identified predicates.

23. The method of claim 22, wherein selecting multiple sample objects from within the user query concept sample space includes, selecting respective sample objects that correspond to respective sample expressions that have a prescribed number of respective predicates that contradict corresponding respective predicates of the boundary k-CNF expression.

24. The method of claim 22, wherein selecting multiple sample objects from within the user query concept sample space includes, selecting respective sample objects that correspond to respective sample expressions that have a prescribed number of respective predicates that are different from corresponding respective predicates of the boundary k-CNF expression;

wherein the prescribed number is chosen by balancing a need for a prescribed number that is small enough that a selected sample object is likely to be indicated by the user as being close to the user's query concept with a need for a prescribed number that is large enough that a selected sample object indicated by the user to be close to the user's query concept is likely to correspond to a sample expression including a predicate that is different from a corresponding predicate of the boundary k-CNF.

25. The method of claim 22, wherein selecting multiple sample objects from the user query concept sample space includes, selecting respective sample objects that correspond to respective sample expressions that have a prescribed number of respective predicates that are different from corresponding respective predicates of the boundary k-CNF expression;

wherein the prescribed number is determined empirically by balancing a need for a prescribed number that is small enough that a selected sample object is likely to be indicated by the user as being close to the user's query concept with a need for a prescribed number that is large enough that a selected sample object indicated by the user to be close to the user's query concept is likely to correspond to a sample expression including a predicate different from a corresponding predicate of the k-CNF.

26. The method of claim 22, wherein defining the user query concept sample space includes, selecting an initial set of sample objects by choosing at least one sample object from each of multiple pre-clustered sets of sample objects.

* * * * *